United States Patent
Wang et al.

(10) Patent No.: US 11,950,036 B2
(45) Date of Patent: *Apr. 2, 2024

(54) SPEAKER ASSEMBLY

(71) Applicant: Apple Inc., Cupertino, CA (US)

(72) Inventors: Paul X. Wang, Cupertino, CA (US); Chanjuan Feng, San Francisco, CA (US); Christopher Wilk, Los Gatos, CA (US); Dinesh C. Mathew, San Francisco, CA (US); Keith J. Hendren, San Francisco, CA (US); Stuart M. Nevill, Los Gatos, CA (US); Daniel K. Boothe, San Francisco, CA (US); Nicholas A Rundle, San Jose, CA (US); Simon S. Lee, San Jose, CA (US); Xiang Zhang, Sunnyvale, CA (US); Thomas H. Tsang, Sunnyvale, CA (US); Rebecca J. Mikolajczyk, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/165,457

(22) Filed: Feb. 7, 2023

(65) Prior Publication Data
US 2023/0188877 A1  Jun. 15, 2023

Related U.S. Application Data

(63) Continuation of application No. 17/021,879, filed on Sep. 15, 2020, now Pat. No. 11,606,633.
(Continued)

(51) Int. Cl.
*H04R 1/02* (2006.01)
*G06F 1/16* (2006.01)
*H04R 3/12* (2006.01)

(52) U.S. Cl.
CPC .......... *H04R 1/028* (2013.01); *G06F 1/1688* (2013.01); *H04R 3/12* (2013.01); *H04R 2499/15* (2013.01)

(58) Field of Classification Search
None
See application file for complete search history.

(56) References Cited

U.S. PATENT DOCUMENTS

| 8,180,075 B2 | 5/2012 | Nelson et al. |
| 8,885,867 B1 | 11/2014 | Tai et al. |
| (Continued) | | |

FOREIGN PATENT DOCUMENTS

| CH | 224072 A | 10/1942 |
| CN | 1930855 A | 3/2007 |
| (Continued) | | |

OTHER PUBLICATIONS

"IPod mini and iPod mini (Second Generation)—Technical Specifications", Support.apple.com; Jul. 26, 2017.
(Continued)

*Primary Examiner* — Paul W Huber
(74) *Attorney, Agent, or Firm* — Dorsey & Whitney LLP

(57) ABSTRACT

An electronic device can include a housing defining an aperture and a display positioned in the aperture. The display and the housing can define an internal volume in which a speaker assembly is positioned. The speaker assembly can include a speaker module and a speaker enclosure in fluid communication, with the speaker enclosure at least partially defining a speaker volume.

20 Claims, 26 Drawing Sheets

Related U.S. Application Data

(60) Provisional application No. 62/946,288, filed on Dec. 10, 2019.

(56) References Cited

U.S. PATENT DOCUMENTS

| | | |
|---|---|---|
| 9,154,869 B2 | 10/2015 | Cohen et al. |
| 9,462,213 B2 | 10/2016 | Yamauchi et al. |
| 9,843,659 B2 | 12/2017 | Yamaguchi et al. |
| 9,870,055 B2 | 1/2018 | Mihelich et al. |
| 9,955,244 B2 | 4/2018 | Rothkopf |
| 10,015,572 B2 * | 7/2018 | Fontana ................ G06F 1/1632 |
| 10,271,127 B2 | 4/2019 | Hurrell et al. |
| 10,645,485 B2 | 5/2020 | Chang |
| 11,102,585 B2 | 8/2021 | Devantier et al. |
| 11,199,881 B2 | 12/2021 | Kapinos et al. |
| 2005/0201550 A1 | 9/2005 | Yang et al. |
| 2006/0067557 A1 | 3/2006 | Imamura |
| 2007/0135180 A1 | 6/2007 | Eaton |
| 2015/0373440 A1 | 12/2015 | Fontana |
| 2019/0020943 A1 | 1/2019 | Hurrell et al. |
| 2019/0090050 A1 | 3/2019 | Rema Shanmugam et al. |
| 2019/0246200 A1 | 8/2019 | Chang |
| 2021/0176547 A1 | 6/2021 | Wang et al. |

FOREIGN PATENT DOCUMENTS

| | | |
|---|---|---|
| CN | 204119424 U | 1/2015 |
| CN | 110475002 A | 11/2019 |
| EP | 0403900 A2 | 12/1990 |
| JP | 2008079268 A | 4/2008 |
| WO | 03001841 A2 | 1/2003 |

OTHER PUBLICATIONS

Burhanuddin, Yeop Majlis, et al., "Compact Electrodynamics MEMS-speaker", <<017 China Semiconductor Technology International Conference (CSTIC), May 8, 2017.

Guo, Xinyi, "Research and Design of Miniature Piezoelectric Ultrasonic Transucer", China Excellent Master's Theses Full-text Database, Jul. 15, 2015.

Jing, Shibo, "Make up for the sound shortcomings of the TV-SONY Echo Bar HT-CT290", Home Theater Technology, No. 8, Aug. 31, 2017.

* cited by examiner

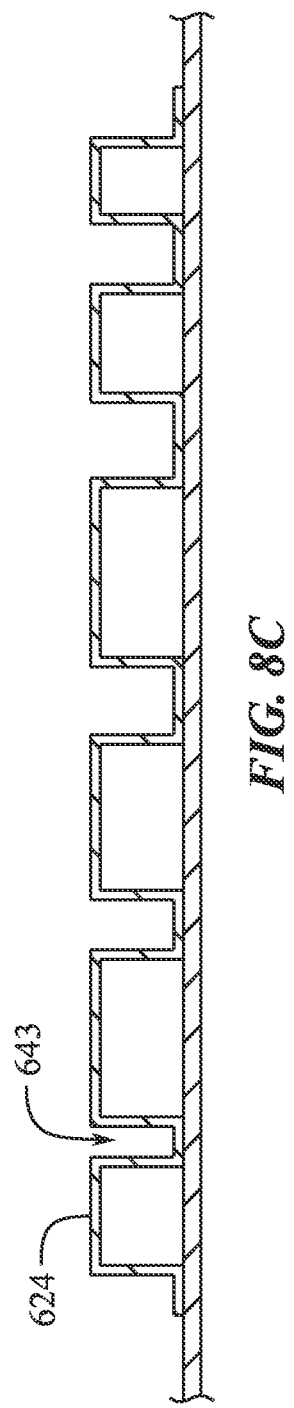

SPEAKER ASSEMBLY

CROSS-REFERENCE TO RELATED APPLICATION(S)

This is a continuation of U.S. patent application Ser. No. 17/021,879, filed 15 Sep. 2020, and entitled "SPEAKER ASSEMBLY," which claims priority to U.S. Provisional Patent Application No. 62/946,288, filed 10 Dec. 2019, and entitled "SPEAKER ASSEMBLY," the disclosures of which are hereby incorporated by reference in their entireties.

FIELD

The described embodiments relate generally to electronic devices. More particularly, the present embodiments relate to speaker assemblies for electronic devices.

BACKGROUND

Over the past several decades, electronic devices have drastically advanced in their functionality. Computer parts have been miniaturized, while also increasing in the amount of performance they can deliver. Electronic devices typically include a housing that surrounds internal system components, such as audio speaker assemblies, circuitry, processing units, display elements, and other electronic components. The reduced dimensions of these various components may offer more efficient use of space, greater flexibility in the placement of components within a housing, reduced housing size and use of material, smaller device sizes, greater ease of transportation and use, and other options for device design.

One challenge is to provide integrated speaker assemblies that maintain a broad frequency range and desirable acoustic performance levels, while also having a reduced size. Due to the increasing demand for electronic device components with reduced dimensions, yet high performance, integrated speaker assemblies can be designed with limited space available for a back volume. Back volume, also referred to herein as speaker volume, is the empty air space in communication with the speaker that can provide air to push against to prevent the speaker from being overdriven. One purpose of the back volume is to contain the back wave or negative wave emitted from the speaker so that the back wave cannot radiate into the ambient atmosphere and interfere with the positive sound waves, thereby allowing for desired levels of acoustic performance. The acoustic performance in the low frequency audio range can be dependent on the back volume size. The back volume can further influence the stiffness of the diaphragm of a speaker. For instance, the larger the diaphragm and the smaller the back volume, the stiffer the diaphragm becomes. A stiff diaphragm can require more power to produce a desired output as compared to a more flexible diaphragm. Accordingly, it can be desirable to increase the back volume of a speaker assembly to achieve desired levels of performance, while reducing the amount of space within the internal volume of an electronic device occupied by a speaker assembly.

SUMMARY

According to some examples of the present disclosure, an electronic device includes a housing defining an aperture, a display positioned in the aperture, the display and the housing defining an internal volume, a speaker enclosure positioned in the internal volume, the speaker enclosure and the housing defining a speaker volume, and a speaker module positioned in the internal volume and in fluid communication with the speaker volume.

In some examples, the speaker volume has a thickness of between 1.7 millimeters (mm) and 2.3 mm. The speaker volume can be between 50 cubic centimeters ($cm^3$) and 100 $cm^3$. The speaker volume can have a length of between 100 mm and 300 mm, a width of between 170 mm and 180 mm, and a thickness of between 1.7 mm and 3 mm.

According to some examples, the speaker module can include a first woofer having a first diaphragm, and a second woofer having a second diaphragm, the first woofer being adjacent to the second woofer, the first diaphragm and the second diaphragm configured to move in opposite directions while being acoustically in phase. The electronic device can include a second speaker enclosure positioned in the internal volume and at least partially defining a second speaker volume, and a second speaker module positioned in the internal volume in fluid communication with the second speaker volume. The speaker module can include a tweeter positioned adjacent to a woofer of the speaker module.

In some examples, the display at least partially defines a first exterior surface of the electronic device, and the housing at least partially defines a second exterior surface of the electronic device positioned opposite the first exterior surface, and a distance from the first exterior surface to the second exterior surface is between 9 mm and 13 mm. The speaker enclosure includes a five-sided box configured to be sealed to the housing to define the speaker volume. The speaker enclosure can include a support rib disposed within the speaker volume. The support rib can at least partially divide the speaker volume into a first volume and a second volume in fluid communication with the first volume, the first volume being in fluid communication with the speaker module and the second volume being in fluid communication with a port at least partially defined by the speaker enclosure. A wall of the speaker enclosure can include a flexible portion configured to oscillate and a rigid portion at least partially surrounding the flexible portion, the support rib being in contact with the rigid portion.

In some examples, the speaker enclosure is positioned between the display and a surface of the housing at least partially defining the internal volume. A first portion of the speaker module can be in fluid communication with the ambient environment and a second portion of the speaker can be in fluid communication with the speaker volume.

According to some examples, an electronic device includes a housing at least partially defining an internal volume, a speaker enclosure disposed in the internal volume, the speaker enclosure at least partially defining a speaker volume having a thickness of between 1.7 and 2.3 mm, a speaker module disposed in the internal volume and in fluid communication with the speaker volume, and a processor and memory disposed in the internal volume.

In some examples, the speaker volume is isolated from the ambient environment. The speaker enclosure can include a six-sided box. The speaker enclosure can define an aperture and the electronic device can include a sealing film occluding the aperture, the sealing film disposed between the speaker enclosure and the housing. The speaker module can direct a negative acoustic wave into the speaker volume. The negative acoustic wave is associated with a desired acoustic output produced by the speaker.

According to some examples, a speaker system includes an enclosure defining an internal volume having a thickness of between 1.7 mm and 2.3 mm and a volume of between 50 $cm^3$ and 100 $cm^3$, and a speaker module in fluid communication with the internal volume; the speaker system having a ratio of a $V_{as}$ to a $V_b$ of less than 2.

BRIEF DESCRIPTION OF THE DRAWINGS

The disclosure will be readily understood by the following detailed description in conjunction with the accompanying drawings, wherein like reference numerals designate like structural elements, and in which:

FIG. 8C shows a cross-section view of the speaker assembly of the electronic device of FIG. 8A.

DETAILED DESCRIPTION

Figure 1:
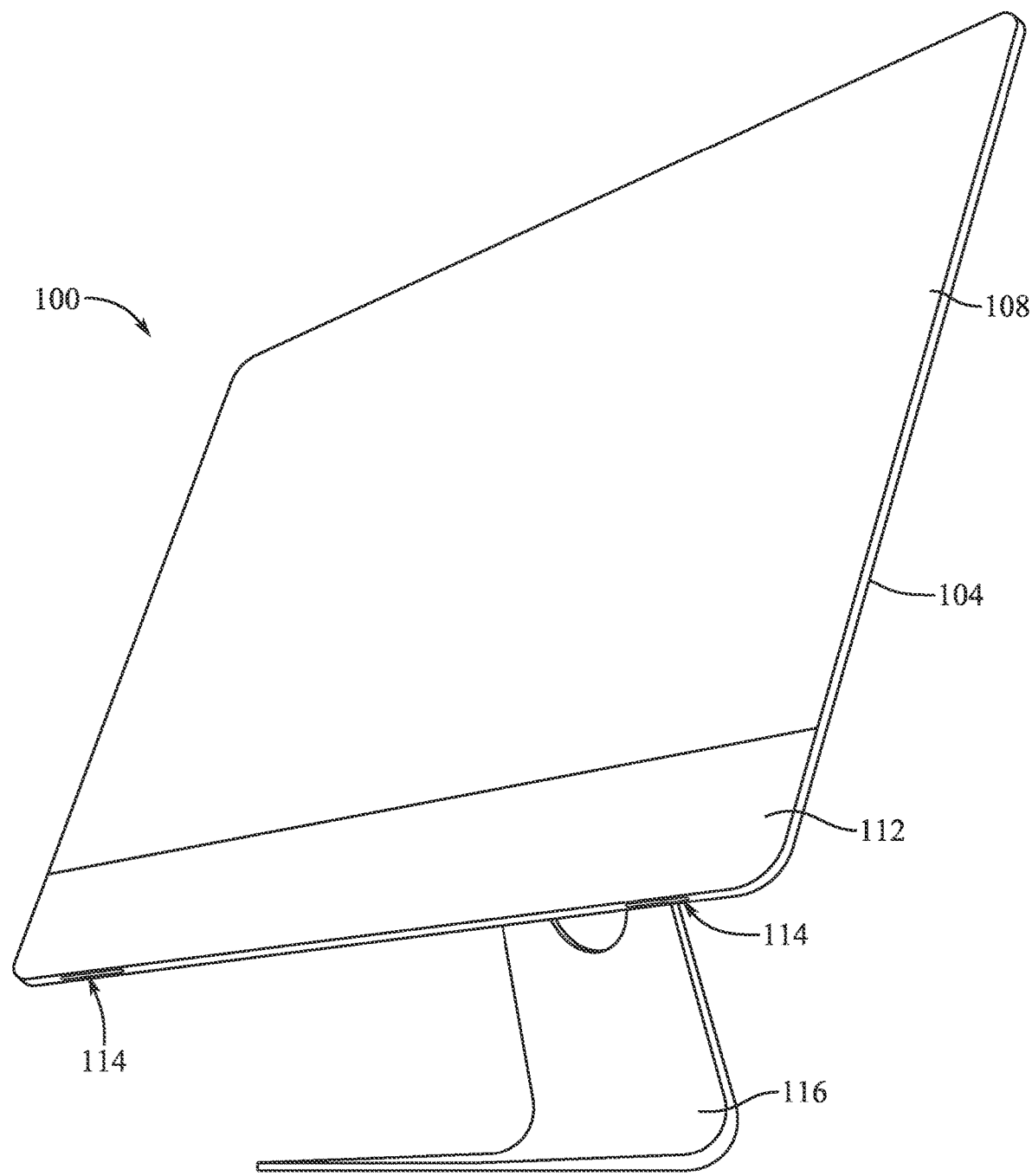
FIG. 1 shows a perspective view of an electronic device.

Reference will now be made in detail to representative examples illustrated in the accompanying drawings. It should be understood that the following descriptions are not intended to limit the examples to one preferred embodiment. To the contrary, it is intended to cover alternatives, modifications, and equivalents, as can be included within the spirit and scope of the described embodiments, as defined by the appended claims.

The following disclosure relates to internal speaker assemblies used in electronic devices. The examples and configurations discussed herein can be applied to a variety of electronic devices including computing devices, desktop computers, all-in-one computers, portable computers, laptop computers, notebook computers, displays (i.e., monitors), tablet computers, televisions, smartphones or any other electronic devices, and combinations thereof.

An electronic device can include a housing defining an aperture. A display, such as a screen, can be disposed in the aperture. The housing and the display can define an internal volume. A speaker assembly can be positioned in the internal volume. The speaker assembly can include a speaker module and a speaker enclosure. The speaker module can include various acoustic components, such as woofers, tweeters, midrange drivers and any other type of driver or speaker component. The speaker enclosure can at least partially define the interior speaker volume. The speaker module can be communicatively coupled with the speaker enclosure though a port or adjoining apertures such that the speaker module is in fluid communication with the speaker volume to function as a back volume.

Generally, the devices described herein are used in an upright position. As used herein, an "upright" configuration or position is a configuration in which an elongated height dimension of the device is more parallel than perpendicular relative to the gravitational direction. For example, an electronic device is upright when it is in a vertical orientation similar to a picture frame hanging on a wall or supported by a kickstand. With this understanding, the terms "top," "bottom," "side," "front," "back," "rear," "above," "below," "under" and other such positional terms are to be understood in relation to an upright electronic device, but are used for reference purposed only. For example, a top portion of a device can be located above a bottom portion in some orientations of the device, but can also be located in line with, below, or in other spatial relationships with the bottom portion depending on the orientation of the device. These reference terms are not intended to limit the device to any one orientation and it should be understood that the devices described herein can be used or operated in orientations other than upright. Additionally, the term "length" or "height" refers to a top-to-bottom measurement, the term "width" refers to a side-to-side measurement, and the term "thickness" refers to a front to back measurement.

The increasing desire to reduce the dimensions of components of electronic devices, such as to allow for additional space within the internal volume of the devices and/or to reduce the size of the devices, can create challenges for the various electrical components that are included within the electronic device housing, such as internal speakers. The smaller form factors typically incur greater costs in the design, manufacturing, and maintenance phases of the engineering lifecycle, and may not allow the same expansion options as larger form factors. Further, it can be difficult to achieve desired performance levels of internal components, such as internal speakers, as a result of a thinner design.

Thus, it can be desirable for the form factor of the speakers to meet certain space constraints to fit within the electronic device housing, while maintaining a broad frequency range and acceptable performance levels. For example, due to the increasing demand for thin devices, integrated speakers tend to have limited space available for a back volume. The back volume of a speaker is often a limiting factor when it comes to maintaining speaker performance while decreasing the overall thickness of an electronic device. Thus, it can be desirable to increase back volume as much as possible in the internal space available within the electronic device.

In some examples, an electronic device includes a housing defining an aperture. The housing can be generally cuboidal in shape and can have a thickness that is many times smaller than the length or width of the housing. A display, such as a screen, can be disposed in the aperture. The display can be sized and shaped to fit securely within the aperture, substantially occluding the aperture, while leaving open space within the housing. In other words, the display can be thinner than the housing, such that when the display is positioned within the housing aperture, an internal volume is defined.

In some examples, the display at least partially defines a first exterior surface of the electronic device, and the housing at least partially defines a second exterior surface of the electronic device positioned opposite the first exterior surface, and a distance from the first exterior surface to the second exterior surface can be between less than about 20 millimeters (mm), for example, between about 9 mm and 13 mm. A speaker assembly can be positioned in the internal volume. The speaker assembly can include a speaker module and a speaker enclosure. The speaker module can include various acoustic components, such as woofers, tweeters, midrange drivers and any other type of driver or speaker component. The speaker enclosure can at least partially define a volume that can function as a back volume of the speaker assembly.

In some examples, the speaker enclosure can be positioned between the display and a surface of the housing (e.g., a back wall of the electronic device). In some examples, the entirety of the speaker enclosure is positioned between the display and the housing. A first portion or front side of the speaker module can be in fluid communication with the ambient environment and a second portion or rear side of the speaker module can be in fluid communication with a speaker volume.

The speaker enclosure can at least partially define the interior speaker volume. The speaker module can be communicatively coupled with the speaker enclosure though a port or adjoining apertures such that the speaker module is in fluid communication with the speaker volume to function as a back volume. In other words, the speaker module is coupled to the speaker enclosure such that acoustic waves emitted from the speaker module enter into the speaker volume. In some examples, the speaker enclosure and the housing define the speaker volume. For instance, one or more walls or sides of the housing can be used in conjunction with the speaker enclosure to define the speaker volume. The speaker enclosure can be an open, five-sided box, with the open side defining an aperture. The speaker enclosure can be configured to be positioned on an interior wall of the housing such that the open end or aperture of the speaker enclosure is covered or occluded by an interior wall of the housing. The speaker enclosure can then be secured to the housing to define the speaker volume. It will be understood that by using the interior surface of the housing wall as one or more of the sides defining the speaker volume, the speaker volume can be increased, while the space within the electronic device occupied by the speaker enclosure can be decreased.

In some examples, the speaker volume can be isolated from the ambient environment, that is, the speaker enclosure can be a sealed or partially sealed system. The speaker enclosure can include a six-sided box, that is, the speaker enclosure can completely define the speaker volume. In some examples, the speaker enclosure can define an aperture that is covered or occluded by a sealing film or component other than the housing. The sealing film can be a thin layer of material and can be disposed between the speaker enclosure and the housing to seal and isolate the speaker volume from the outside environment. By using a thin sealing film, the thickness of the speaker enclosure can be reduced while simultaneously ensuring that the speaker enclosure is a sealed system prior to securing the speaker enclosure in the electronic device housing.

The speaker volume that is at least partially defined by the speaker enclosure can have a length of between 100 mm and 300 mm, a width of between 170 and 180 mm, and a thickness of between 1.7 and 2.3 mm. In some examples, the speaker volume can be between about 5 cubic centimeters ($cm^3$) and 500 $cm^3$, between about 25 $cm^3$ and about 300 $cm^3$, between about 50 $cm^3$ and about 150 $cm^3$, between about 50 $cm^3$ and about 100 $cm^3$, or between about 70 $cm^3$ and about 90 $cm^3$, for example about 80 $cm^3$. In some examples, the speaker volume can have a substantially flat cuboidal or ellipsoidal shape that can allow for overall reduction in the thickness of the speaker volume while maintaining a desired level of acoustic quality. In some examples, the ratio of the area of the speaker enclosure combined with the stiffness of speaker ($V_{as}$) to the volume of the box or enclosure ($V_b$) is less than about 2, less than about 1.75, less than about 1.5, less than about 1.25, less than about 1, or less than about 0.75 or smaller.

According to some examples, the speaker module includes a first woofer having a first diaphragm, and a second woofer having a second diaphragm positioned adjacent to the first woofer. The first woofer and the second woofer can be positioned side by side so as to not increase the thickness of the speaker module. It will be understood that the examples disclosed herein are not limited to woofers, but can be applied to other types of speaker drivers and combinations thereof. The first woofer and the second woofer can be acoustically in phase. The diaphragm of the first woofer and the diaphragm of the second woofer can be positioned in opposite orientations such that the diaphragms move in opposite directions when the first woofer and the second woofer are producing the same audio output. By oscillating in opposite directions while being acoustically in phase, the first and second woofers are able to at least partially cancel the forces generated by the operation of the speaker. The force cancelation can reduce potential rattle or interference of various components in proximity with the speaker module, thereby improving sound quality. It will be understood that alternative force cancellation configurations can be implemented. For instance, a primary woofer can be positioned between and adjacent to two smaller woofers. The force generated by the two smaller woofers can be substantially equal and opposite to the force generated by the primary woofer. Thus, when acoustically in phase, the primary woofer and the two smaller woofers have the effect of substantially canceling the generated forces.

The electronic device can include a plurality of speaker assemblies disposed in the internal volume thereof. For instance, the electronic device can include two speaker assemblies positioned in the internal volume defined by the housing. In some examples, a first speaker assembly can be positioned near a left side of the housing, and a second speaker assembly can be positioned near a right side of the housing. The first and second speaker assemblies can be substantially identical. In some examples, the first and second speaker assemblies are substantially mirror images of one another (e.g., chiral). In some examples, the speaker enclosures and the speaker modules of the first and second speaker assemblies are substantially identical, however, the placement of the speaker module in relation to the speaker enclosure of each speaker assembly can vary. The speaker module can include one or more tweeters positioned adjacent to one or more woofers. The tweeter can be a speaker driver that produces acoustic output at a high frequency range. The tweeter can be positioned to be proximate a port or vent to the ambient environment. In some examples, the tweeter is at least partially covered by a diaphragm of the speaker module. The tweeter can be positioned between a diaphragm and a back wall of the housing of the electronic device. In some examples, the tweeter is positioned between the main driver, such as a woofer, and bottom wall of the housing, the bottom wall defining a port to the ambient environment.

As discussed above, it can be desirable to maximize the speaker volume while minimizing the space occupied by the speaker enclosure. One method for accomplishing this is to decrease the thickness of the walls of the speaker enclosure. By thinning the walls of the speaker enclosure, however, the structural integrity of the speaker enclosure can become a concern. For instance, if the walls of the speaker enclosure are too thin they can become flimsy, and the acoustic waves emitted from the speaker module can cause unwanted shaking or vibration of the speaker enclosure. Accordingly, in some examples, the speaker enclosure can include one or more support ribs configured to support or stiffen one or more walls of the speaker enclosure. The support ribs can be disposed inside the speaker volume defined by the speaker enclosure and/or on an exterior surface of the speaker enclosure. The support ribs can be affixed to or integrally formed on one or more of the speaker enclosure walls and/or the housing.

In some examples, the speaker assembly can be a ported speaker assembly (e.g., a bass reflex system) that uses a port or vent defined by the speaker enclosure to enable the acoustic waves from a rear side of the diaphragm to increase the efficiency of the system at low frequencies as compared to a typical sealed or closed box speaker assembly. In some examples, the speaker assembly can be a ported system with the support rib at least partially dividing the speaker volume into a first volume and a second volume in fluid communication with the first volume. The first volume can be in fluid communication with a rear portion of a woofer of the speaker module, and the second volume can be in fluid communication with a port at least partially defined by the speaker enclosure and exiting to the ambient environment. In other words, the support rib can both reinforce the speaker enclosure and also direct air flow in a ported system.

In some examples, the speaker assembly can include a passive radiator system that uses the sound otherwise trapped in the enclosure to excite a resonance. In some examples, a passive radiator can be securely positioned within a hole in a wall of the speaker enclosure. In some examples, an area of the speaker enclosure itself can act as a passive radiator. For instance, a wall of the speaker enclosure can include a flexible portion configured to oscillate, and can also include a rigid portion at least partially surrounding the flexible portion. In some examples, an entire face of an enclosure wall, or a portion thereof, is the flexible portion configured to vibrate, and the side walls of the speaker enclosure are rigid to support the flexible portion. In some examples, a plurality of support ribs are positioned in the speaker volume to form the rigid portion and to define the flexible portion of the speaker enclosure.

These and other examples are discussed below with reference to FIGS. 1-15A. However, those skilled in the art will readily appreciate that the detailed description given herein with respect to these Figures is for explanatory purposes only and should not be construed as limiting.

FIG. 1 illustrates a perspective view of an electronic device 100. Electronic device 100 can correspond to any form of a wearable electronic device, a portable media player, a media storage device, a portable digital assistant ("PDA"), a tablet computer, a computer, a mobile communication device, a GPS unit, a remote-control device, or any other electronic device. The electronic device 100 can be referred to as an electronic device, or a consumer device. The electronic device 100 can include a display 108, a housing 104, a chin 112 with vents or apertures 114, and a stand 116. The display 108 can include a computer display such as, for example, a liquid crystal display (LCD), organic light-emitting diode (OLED) display, or any desired display component. The display 108 can be referred to as a monitor or a display screen of the electronic device 100. The housing 104 can be a shell to protect and cover parts of the display 108. In some examples, the housing 104 can include any desired materials, such as rigid and durable materials. For example, the housing 104 can include plastic, metal, ceramic, glass materials, or combinations thereof. In some examples, the housing 104 can include aluminum. In some examples, the housing 104 can define a bezel (i.e., a front-facing surface of the housing) extending around a perimeter of the display 108. Further details of the electronic device 100 are provided below with reference to FIG. 2.

Figure 2:
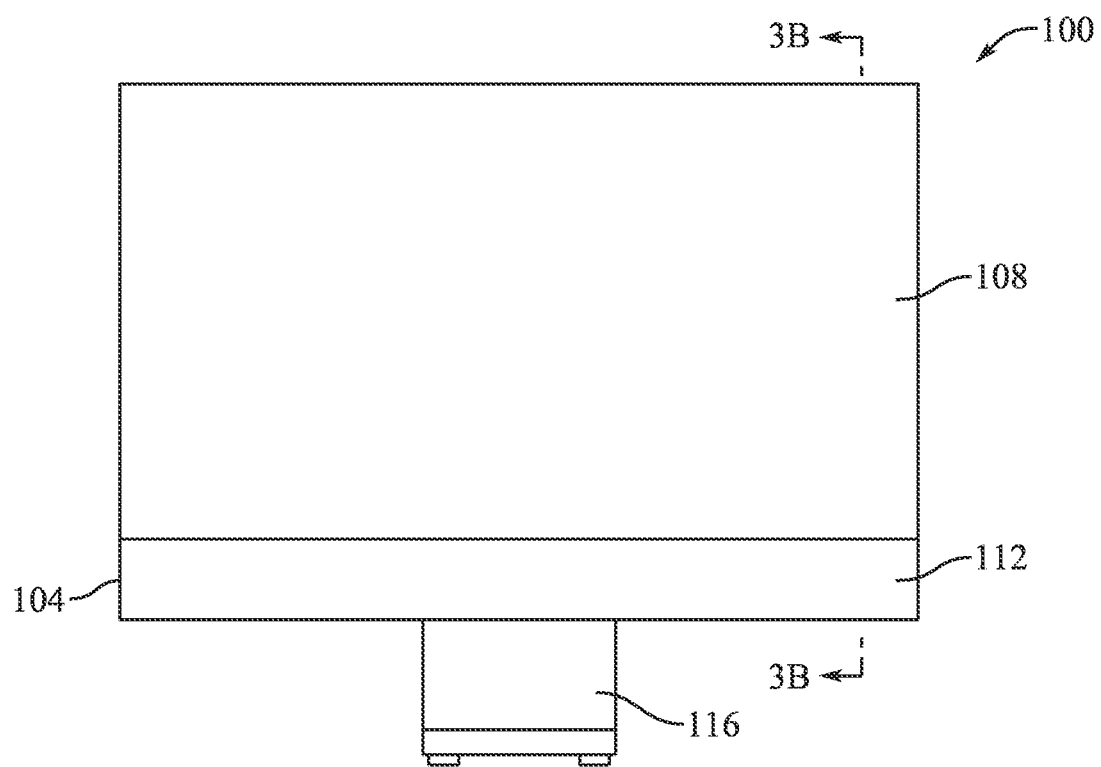
FIG. 2 shows a front view of the electronic device of FIG. 1.

As shown in FIG. 2, the display 108 of the electronic device 100 can extend to the outer edge perimeter of the housing 104. The housing 104 can define an aperture, or can be an open-ended enclosure wherein the display 108 is positioned within the aperture to define an internal volume within the housing 104. The chin 112, can also be affixed to the housing 104 to define, at least in part, the internal volume. In some examples, the chin 112 can be integrally formed with the housing 104. The chin 112 can be adjacent to and flush with an exterior surface defined by the display 108. The chin 112 can contain internal electrical components. In some examples, the display 108 may not extend beyond or overlap with the chin 112, which can provide additional space in the internal volume of the device 100 when the chin 112 is thinner than the display 108. Thus, the internal volume defined between the chin 112 and the housing 104 can be used for larger internal components that may not otherwise fit between a rear surface of the display 108 and the housing 104. In some examples, the thickness of the housing 104 and the display 108 can be approximately equal to the thickness of the chin 112 and the housing 104 when the electronic device 100 is assembled. Accordingly, in some examples, the device 100 can have a substantially constant thickness along one or both of its width and height. In some examples, the display 108 extends fully to the bottom edge of the housing 104 (i.e., there is no chin 112). Further details of the electronic device 100 are provided below with reference to FIG. 3A.

Figure 3A:
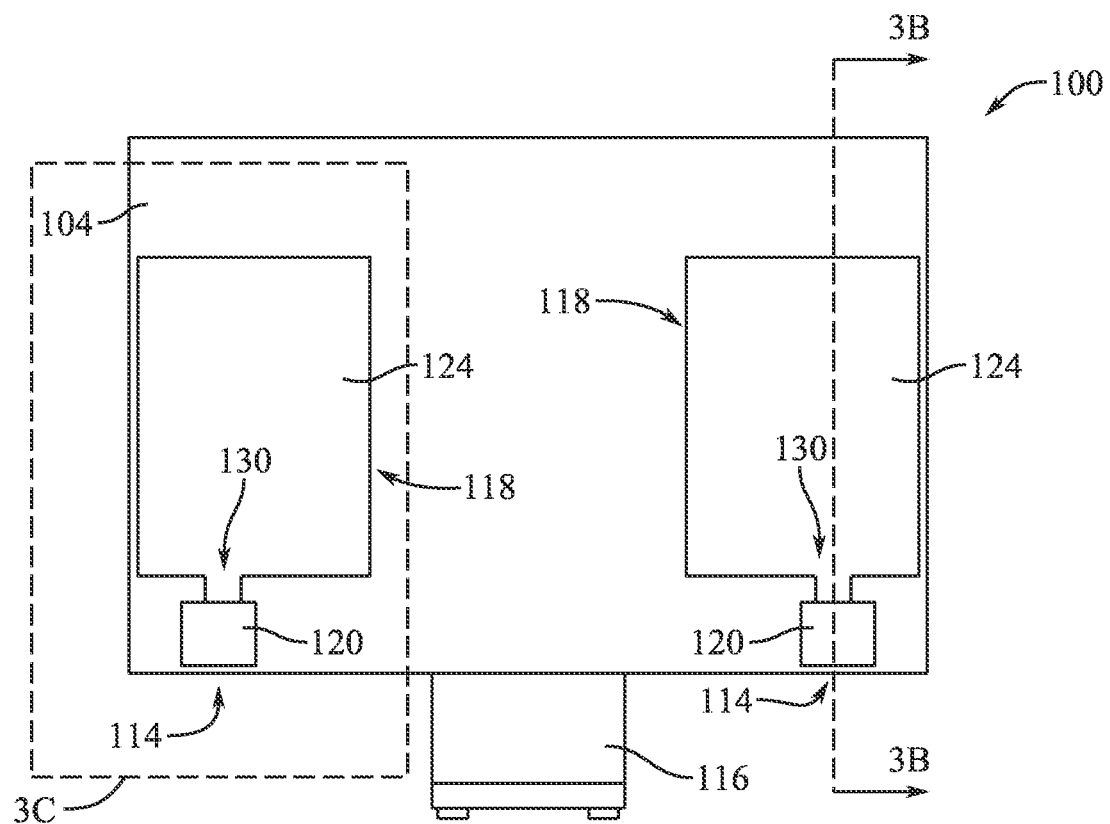
FIG. 3A shows a cross-sectional front view of the electronic device of FIG. 1.

FIG. 3A illustrates a cross-sectional front view of the electronic device 100 including speaker assemblies 118 positioned in the internal volume defined by the housing 104. Although illustrated as including two speaker assemblies 118, in some examples an electronic device 100 can include any desired number of speaker assemblies. Each speaker assembly 118 can include a speaker module 120 and a speaker enclosure 124. In some examples, the electronic device 100 can include two speaker assemblies 118 positioned on opposite sides of the housing 104, although the one or more speaker assemblies 118 can be positioned at any desired location. In some examples, each speaker assembly 118 is positioned symmetrically opposite from another speaker assembly 188. In some examples, the speaker assembly 118 is disposed within the internal volume defined by the housing 104 of the electronic device 100. The speaker module 120, disposed in the internal volume, can be in fluid communication with the ambient environment through the housing 104. For instance, the speaker module 120 can be in communication with the port or opening 114. The speaker module 120 can further be in fluid communication with the speaker enclosure 124 by through a port or tunnel 130 therebetween.

In some examples, the speaker enclosure 124 is generally cuboidal in shape. In some examples, one or more of the edges of the speaker enclosure 124 can be smooth or rounded. In some examples, the edges of the speaker enclosure 124 can all be smooth or rounded such that there are no distinct corners or sides to the speaker enclosure 124. For instance, the speaker enclosure 124 can be generally ellipsoidal in shape. In some examples, the speaker enclosure 124 can have any desired shape, and can be polyhedral or even irregularly shaped. The speaker enclosure can be several time longer and wider than it is thick, giving the speaker enclosure 124 a thin or flat overall shape. In some examples, the speaker volume at least partially defined by the speaker enclosure 124 has a thickness of between 1.5 millimeters (mm) and 3 mm, between 1.6 mm and 2.8 mm, between 1.7 mm and 2.7 mm, between 1.8 mm and 2.6 mm, between 1.9 mm and 2.5 mm, or between 2 mm and 2.4 mm, for example about 2.7 mm. The speaker volume can be between about 25 $cm^3$ and about 150 $cm^3$, for example, between about 70 $cm^3$ and about 90 $cm^3$. The speaker volume can have a length of between 100 and 300 mm, between 150 mm and 250 mm, or between 200 mm and 230 mm. In some examples the speaker volume can have a width of between 170 and 180 mm, and a thickness of between 1.7 and 2.3 mm. Further details of the electronic device 100 are provided below with reference to FIG. 3B.

The speaker enclosure 124 can be formed from sheet metal, polymeric, ceramic, or other materials, or combinations thereof. In some examples, the speaker enclosure 124 is a unitary piece. The speaker enclosure 124 can be formed by any combination of additive and/or subtractive manufacturing processes, such as a CNC manufacturing process. In some examples, the speaker enclosure 124 is a unitary piece of the housing 104 itself and can be formed along with the housing 104 in a full CNC manufacturing process. Further details of the electronic device 100 are provided below with reference to FIG. 3B.

Figure 3B:
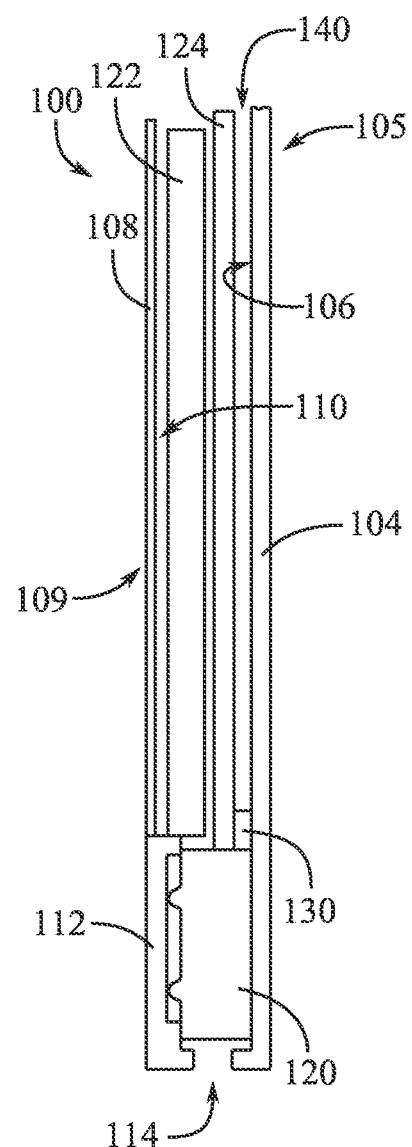
FIG. 3B shows a cross-sectional side view of the electronic device of FIG. 1.

FIG. 3B illustrates a cross-sectional side view of the electronic device 100. In some examples, the display 108 at least partially defines a first exterior surface 109 (e.g., a front) of the electronic device 100 and a first interior surface 110 that at least partially defines the internal volume of the device 100. The housing 104 at least partially defines a second exterior surface 105 (e.g., a back) of the electronic device 100 and a second interior surface 106 that at least partially defines the internal volume and that is positioned opposite the first interior surface 110. In some examples, a distance from the first interior surface 110 to the second interior surface 106 can be less than about 50 mm, less than about 40 mm, less than about 30 mm, less than about 20 mm, or even less than about 15 mm or thinner. In some examples, the distance between the first interior surface 110 to the second interior surface 106, and thus the thickness of the internal volume defined by the display 108 and the housing 104 can be between about 5 mm and about 15 mm, for example, between about 9 mm and about 13 mm.

In some examples, the speaker module 120 can be positioned proximate a bottom edge or region of the housing 104 and can be below the display 108. For example, the speaker module 120 can be positioned in the region of the internal volume positioned between and defined by the housing 104 and the chin 112. In some examples, the speaker enclosure 124 can be positioned between the housing 104 and the display 108. Thus, in some examples, a portion of the speaker assembly 118, such as the speaker enclosure 124 can be positioned between the display 108 and the housing 104, while another portion of the speaker assembly, such as the speaker module 120 can be positioned between the chin 112 and the housing 104. In some examples, the display 108 can include additional components 122, such as a backlight, touch sensitive layer, connectors, or any other additional display components, as desired. In some examples, no components other than the display 108, display components 122, and speaker enclosure 124 can be present in the internal volume between the display 108 and the housing 104. That is, any other components of the electronic device 100 can be positioned at other locations in the housing, for example, above the display 108 or in the internal volume between the chin 112 and the housing 104.

The speaker enclosure 124 can at least partially define a speaker volume 140. The speaker volume 140 can receive acoustic waves (such as negative or back waves) produced by the speaker module 120. The speaker volume 140 can be referred to as a back volume or a speaker back volume. The speaker volume 140 can be in fluid communication with a rear or back portion of the speaker module 120 by the port 130. A front portion of the speaker module 120 can be in communication with the outside or ambient environment through the port 114. In some examples, the acoustic waves emitted from the front portion of the speaker module 120 are allowed to exit the electronic device 100 without any enclosure or partition in front of them. In some examples, the port 114 includes vents, a slit, a grill, or pattern of holes to allow passage of the acoustic waves from the front portion of the speaker module while providing some protection or physical barrier between the internal volume and ambient environment and providing a desired cosmetic appearance to the device 100.

Figure 3C:
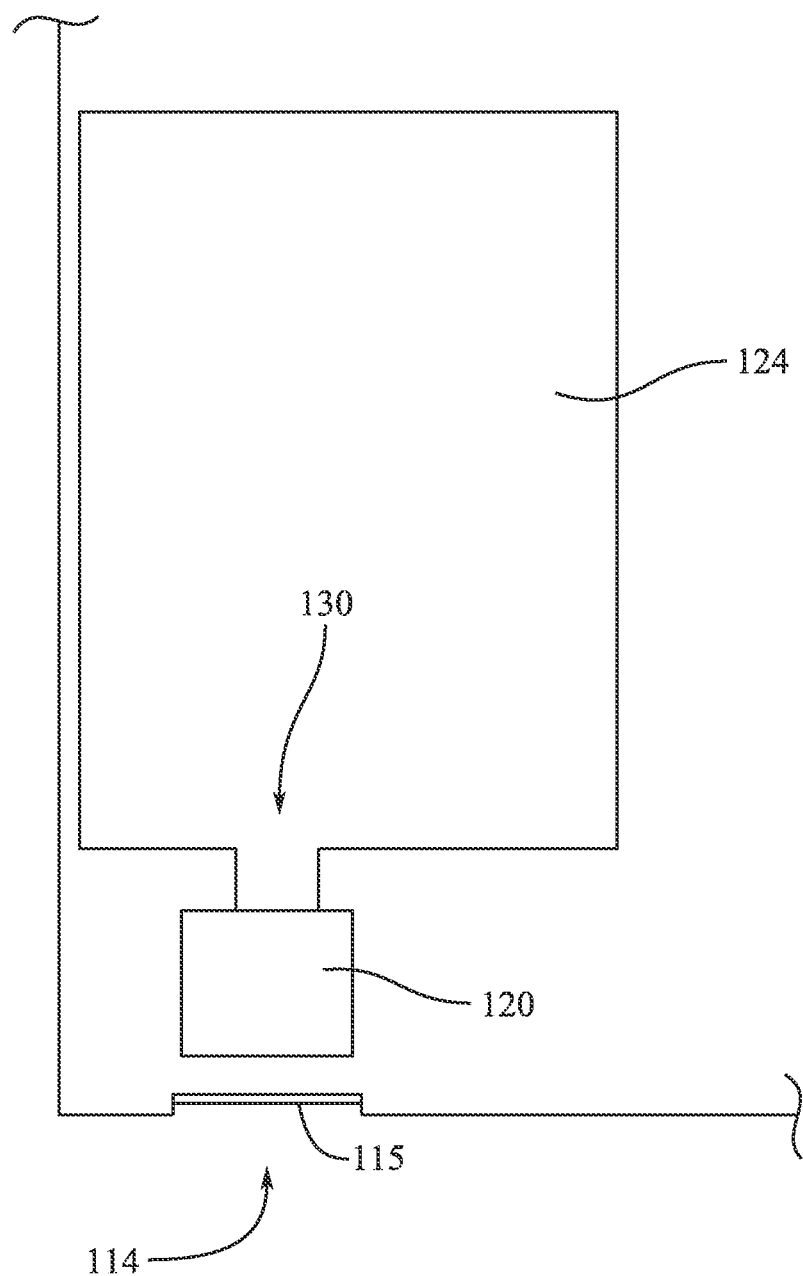
FIG. 3C shows a cross-sectional front view of a portion of the electronic device of FIG. 1.

FIG. 3C shows a close-up view of an example of a portion of the electronic device 100 shown in FIG. 3A. As shown in FIGS. 3A and 3B, the speaker module 120 can be in fluid communication with a speaker enclosure 124 through a port 130. The speaker module 120 can be in communication with the outside or ambient environment through the port 114, as shown in FIG. 3B. In some examples, however, one or more components or materials can be disposed between the speaker module 120 and the port 114 in the internal volume defined by the housing 104. In some examples, this component 115 can include an air-permeable material that can restrict some amount of air flow through the port 114, while still allowing an acoustic signal generated by the speaker module 120 to pass therethrough. In this way, the presence of the component 115 can reduce undesirable flow noise, thereby producing a clearer acoustic signal.

In some examples, the component 115 can include a material such as a foam and/or a mesh, as described herein. In some examples, the component 115 can overlay or occlude substantially an entire area of the aperture 114. In some examples, however, the component 115 may only partially overlay or occlude the aperture 114, as desired. Further, in some examples, the component 115 can include a single portion of material, but in other examples, the component 115 can include multiple portions of the air-permeable material. Further details of the electronic device 100 are provided below with reference to FIG. 4.

Figure 4:
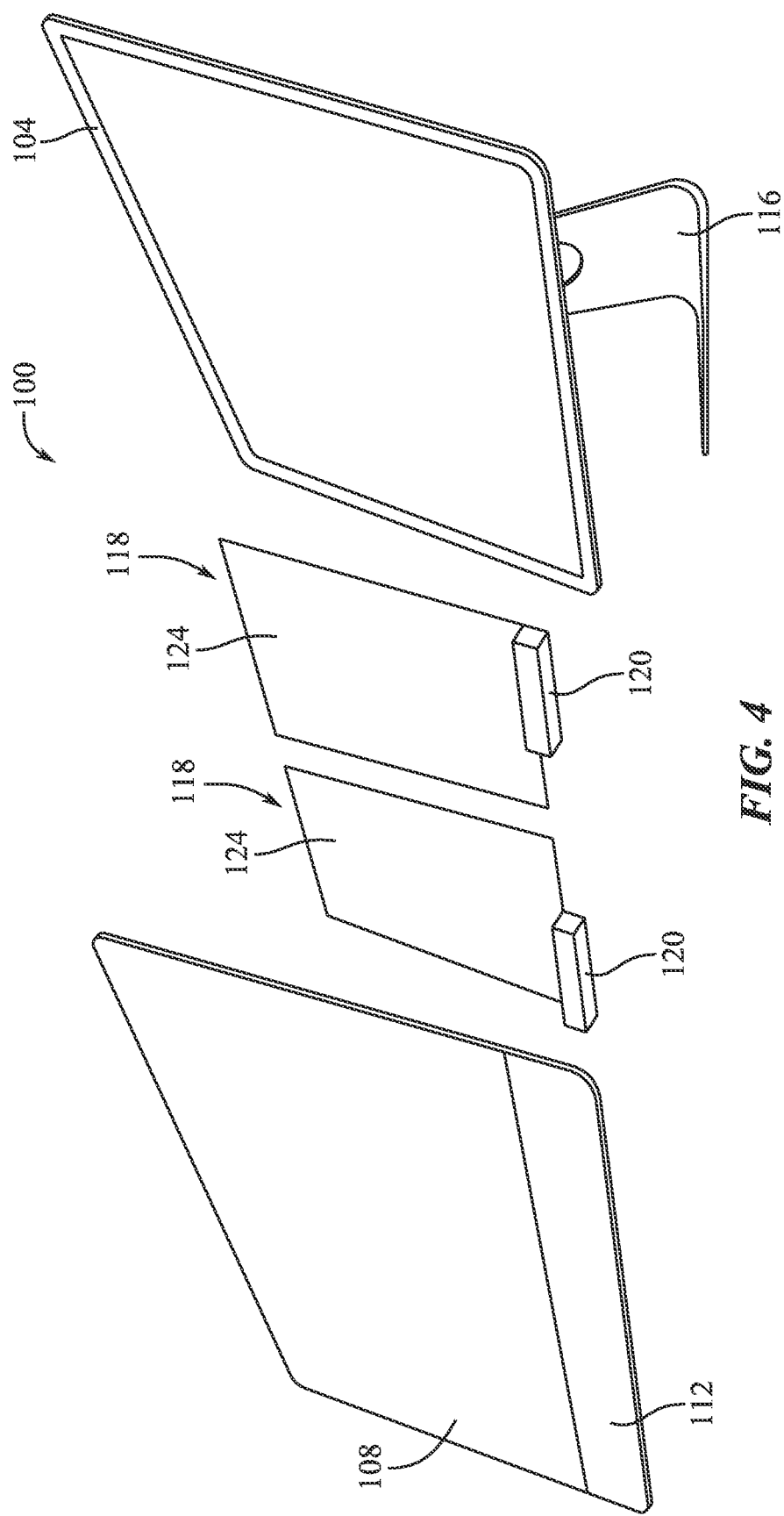
FIG. 4 shows an exploded perspective view of the electronic device of FIG. 1.

FIG. 4 shows a perspective exploded view of the electronic device 100. As shown, the speaker assemblies 118 can be positioned between the display 108 and the housing 104. In some examples the chin 112 is connected to the display 108 and also to the housing 104 such that portions of the speaker assemblies 118, such as the speaker modules 120, can be at least partially sandwiched between the chin 112 and the housing 104. During manufacturing, the housing 104 can be formed, and thereafter the speaker module 120 and the speaker enclosure 124 can be placed or positioned within the housing 104. In some examples, the display 108 and the chin 112 can be secured to the housing 104 such that the speaker enclosure is positioned between the display 108 and the housing 104.

Any variety of device configurations can be constructed to include any number of speaker assemblies in any number and variety of configurations, as described herein. A speaker assembly or any other component of an electronic device can be formed not only from the specific materials and components described herein, but from any number of materials, components, and processes in any combination, as described herein. Various examples of speaker assemblies, as described herein, and functions of the same, are described below with reference to FIGS. 5A-5B.

Figure 5A:
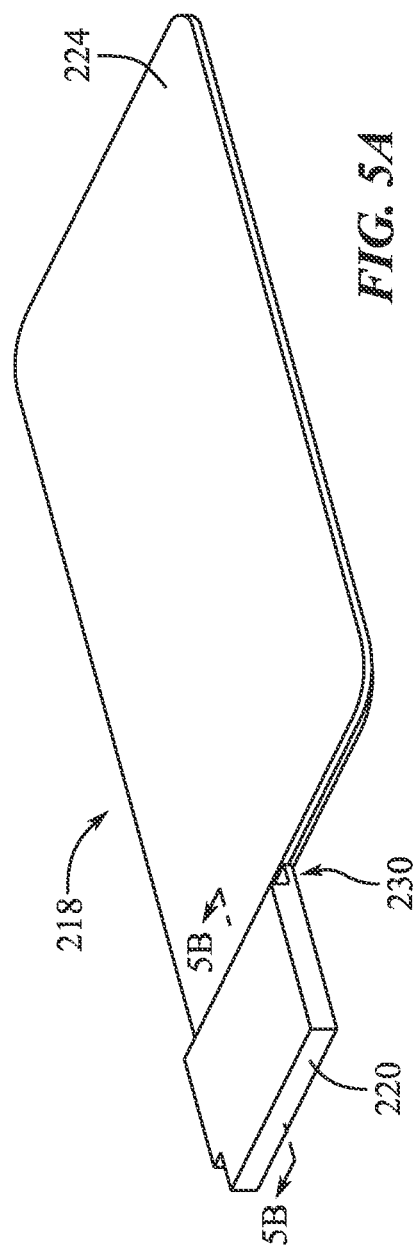
FIG. 5A shows a perspective view of a speaker assembly.

FIG. 5A illustrates a speaker assembly 218 including a speaker module 220 connected to a speaker enclosure 224 by a port 230. The speaker assembly 218 can be substantially similar to, and can include some or all of the features of the speaker assemblies described herein, such as speaker assembly 118. In some examples, a thickness of the speaker module 220 is greater than the thickness of the speaker enclosure 224. As shown, the surface area of the speaker enclosure 224 can be several times greater than that of the speaker module 220. In some examples, the thickness of the port 230 is equal to or less than the thickness of the speaker enclosure 224. In some examples, the width of the speaker module 220 is approximately equal to the width of the speaker enclosure 224. In some examples, the width of the port 230 is equal to or less than the width of the speaker enclosure 224. In some examples, the width of the port 230 is equal to or less than the width of the speaker module 220.

Figure 5B:
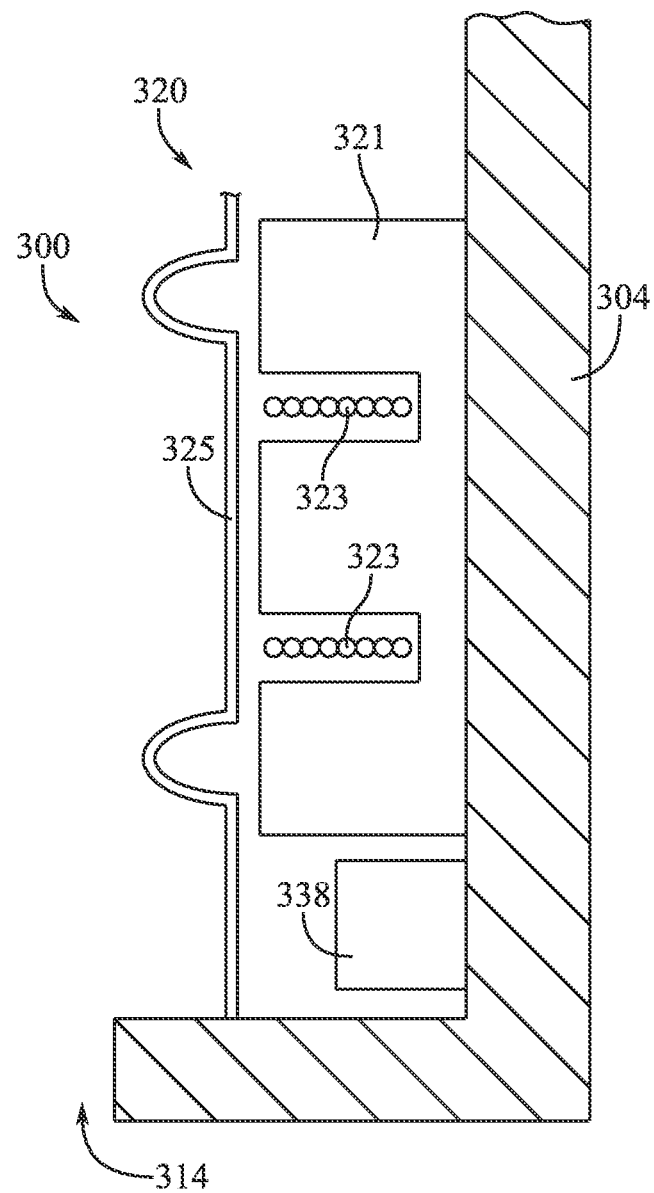
FIG. 5B shows a cross-sectional side view of a speaker module.

FIG. 5B shows a cross-sectional side view of a speaker module 320 disposed within a housing 304 of an electronic device 300. The electronic device 300, including the speaker module 320 and the housing 304, can be substantially similar to, and can include some or all of the features of the electronic devices and speaker assemblies described herein. The speaker module 320 can include a diaphragm 325 coupled to a magnetic component 321. The magnetic component 321 can include gaps or grooves within which is disposed a wound coil 323, such as a copper coil or any conductive coil that is capable of being influenced by an electromagnetic field. In some examples, the component 321 can be any component capable of generating or being influenced a desired electromagnetic field. The diaphragm 325 can be affixed to the coil 323. As pulses of electricity pass through the coil 323, the direction of its magnetic field is rapidly changed, resulting in alternating attraction and repulsion to the magnetic component 321, causing vibrations back and forth. The coil 323 can be attached to the diaphragm which amplifies these vibrations, pumping sound waves into the surrounding air.

In some examples, the electronic device 300 can further include a high frequency range driver such as a tweeter 338. The tweeter 338 can be positioned within a space defined by housing 304, the side of the magnetic component 321, and the diaphragm 325. In other words, the tweeter 338 can be located above a bottom wall of the housing 304 and below the magnetic component 321. Further, the tweeter 338 can be positioned between the diaphragm 325 and the back wall of the housing 304. In some examples, the tweeter 338 is positioned closer to the port 314 that leads to the outside environment than the magnetic component 321. In some examples, the tweeter 338 can be considered part of the speaker module 320, although in some other examples the tweeter 338 can be considered as a separate component. Various examples of speaker assemblies, as described herein, and functions of the same, are described below with reference to FIG. 6.

Figure 6:
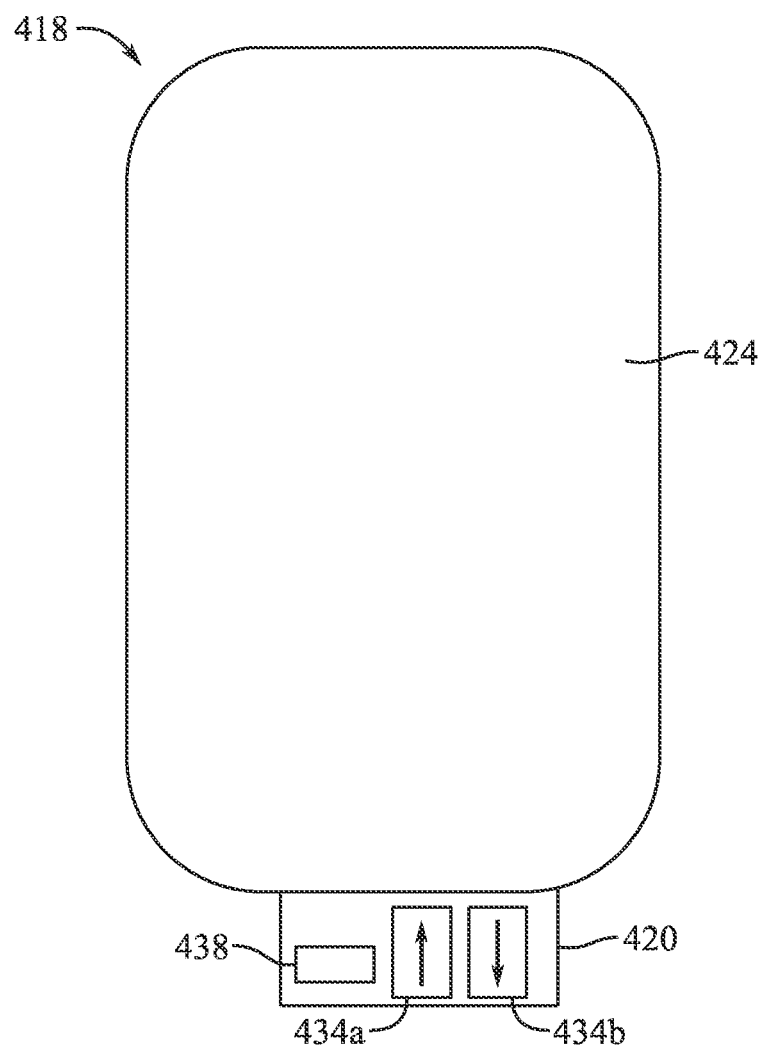
FIG. 6 shows a front view of a speaker assembly.

FIG. 6 illustrates a front view of a speaker assembly 418. The speaker assembly 418 can be substantially similar to, and can include some or all of the features of the speaker assemblies described herein. For instance, the speaker assembly 418 can include a speaker module 420 and a speaker enclosure 424. In some examples, the speaker module 420 is joined directly to the speaker enclosure 424 (i.e., there is no tunnel or conduit extending between the speaker module 420 and the speaker enclosure 424). In some examples, the speaker module 420 can include an aperture or opening that is aligned with and abutting or corresponding aperture in the speaker enclosure 424.

In some examples, the speaker module 420 includes a first woofer 434a, a second woofer 434b, and a tweeter 438. The first woofer 434a can be positioned adjacent to the second woofer 434b. The first woofer 434a and the second woofer 434b can be offset or side-by-side to reduce the thickness of the speaker module 420. In some examples, the first woofer 434a can be acoustically in phase with the second woofer 434b, while the diaphragms of the first woofer 434a and the second woofer 434b can be configured to move in opposite directions (as indicated by the arrows) when producing the same acoustic signal. Thus, the first woofer 434a and the second woofer 434b can at least partially cancel the forces created by the vibrating diaphragms in the speaker module 420. The force cancelation can reduce potential rattle or interference of various components in proximity with the speaker module. As discussed herein, alternative force cancelation configurations can be implemented. For instance, a primary woofer (not shown) can be positioned between and adjacent to two smaller woofers (not shown). The force generated by the two smaller woofers can be equal and opposite to the force generated by the primary woofer. Thus, when acoustically in phase, the primary woofer and the two smaller woofers have the effect of substantially canceling the generated forces. Further details of speaker assemblies are provided below with reference to FIG. 7A.

Figure 7A:
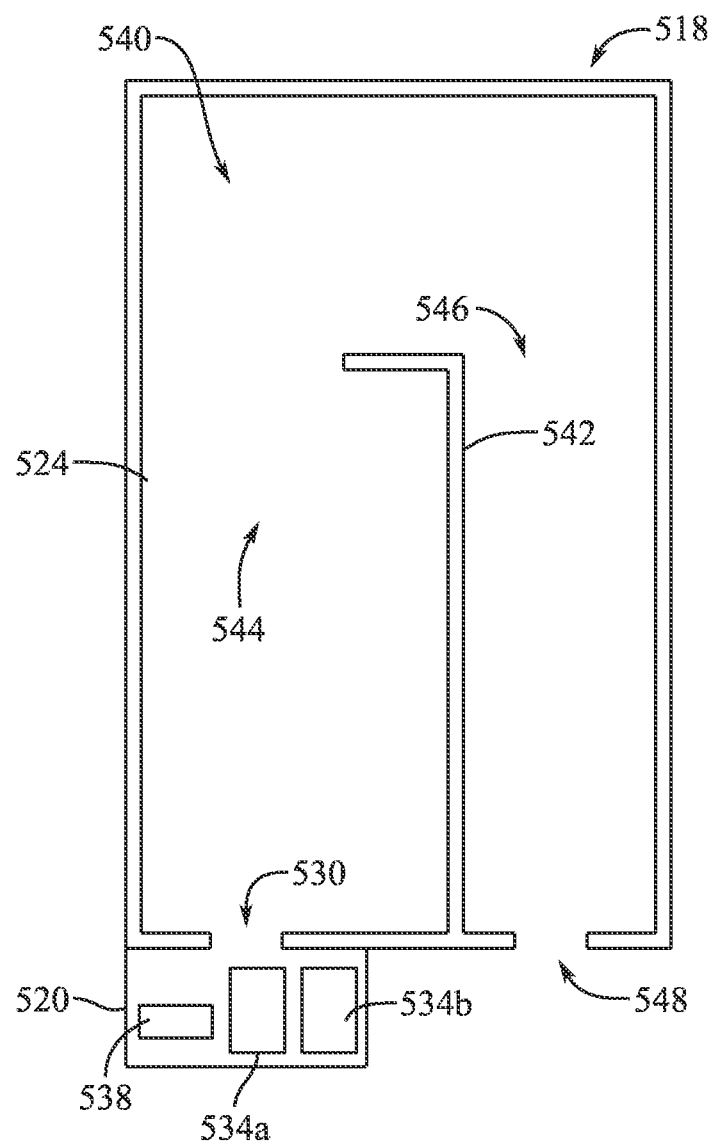
FIG. 7A shows a cross-sectional front view of a speaker assembly.

FIG. 7A shows a cross-sectional front view of a speaker assembly 518 including a speaker module 520 and a speaker enclosure 524. The speaker assembly 518 can be substantially similar to, and can include some or all of the features of the speaker assemblies described herein. The speaker module 520 can include a first woofer 534a and a second woofer 534b and a tweeter 538. The speaker module 520 can be in fluid communication with the speaker volume 540 defined by the speaker enclosure 524 through a port 530. In some examples, the speaker enclosure 524 can include a rib or support 542 disposed within the speaker volume 540. The rib 542 can be coupled to one or more sides of the speaker enclosure 524. In some examples, the rib 542 can be substantially L-shaped and can be shorter in length than the speaker volume 540, for example, the rib 542 can be about 200 mm in length. The rib 542 can be configured to provide structural support to one or more walls, such as a front wall (not shown) of the speaker enclosure 540.

The rib 542 can direct airflow within the speaker volume 540. The rib 542 can also at least partially divide the speaker volume 540 into a first portion 544 and a second portion 546. The first portion 544 can be in direct communication with the speaker module 520 and the second portion 546 be in direct communication with a port 548 leading to the ambient environment. In some examples, the port 548 can be approximately 40 mm wide, although the port 548 can have any desired size and shape. In this manner, the support rib 542 can cause the speaker enclosure 540 to function as a ported speaker assembly (e.g., a bass reflex system) that uses a port or vent at least partially defined by the support rib 542 and the enclosure 524 to enable the negative acoustic waves from the speaker module 520 to increase the efficiency of the system at low frequencies as compared to a typical sealed or closed box speaker assembly. In some examples, the speaker assembly 518 can port into the internal housing of the electronic device itself and rely on leakage in the device to disseminate sound. In some examples, the speaker assembly 518 can port into the ambient environment through a port or opening in the housing of the device. Further details of speaker assemblies are provided below with reference to FIG. 7B.

Figure 7B:
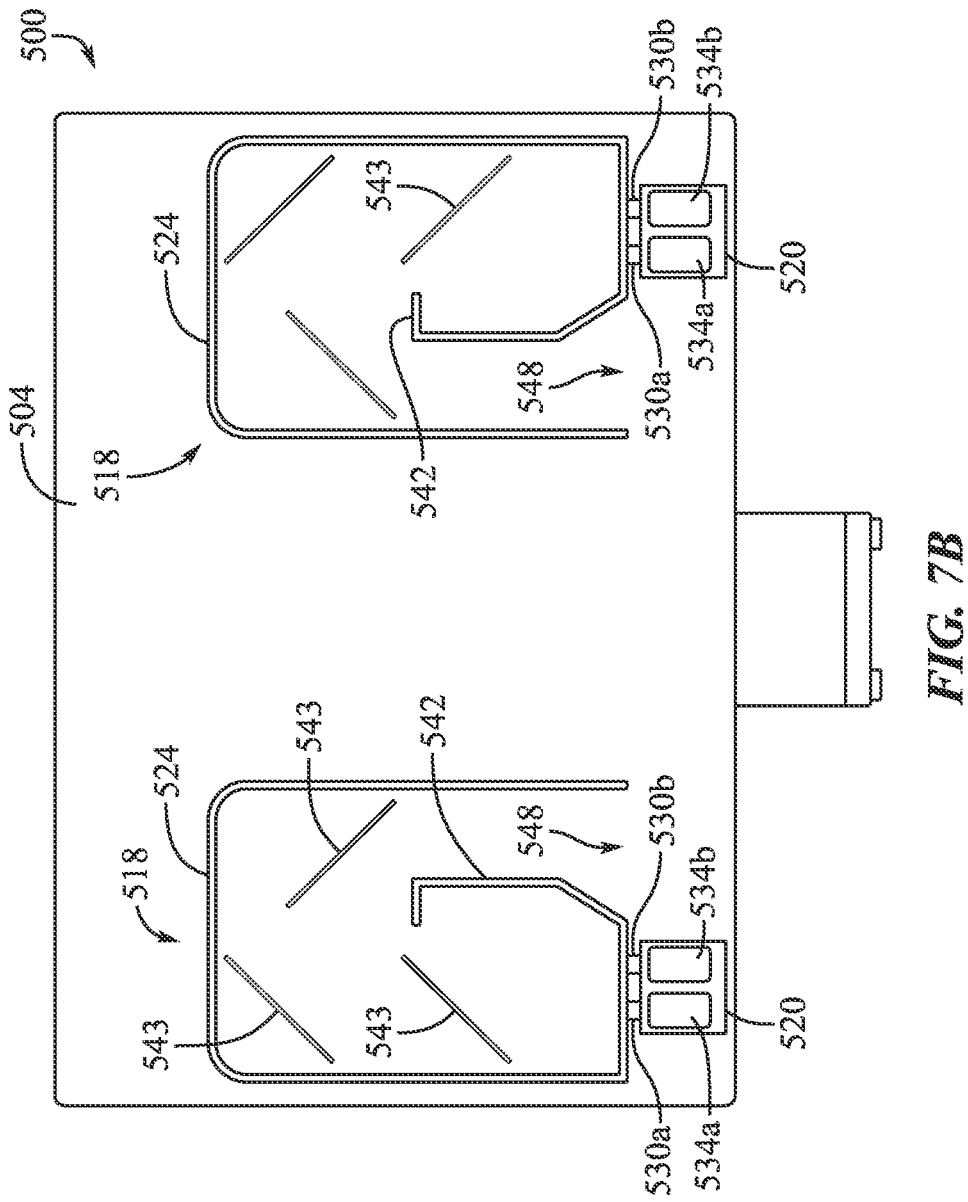
FIG. 7B shows a cross-sectional front view of an electronic device.

FIG. 7B illustrates a cross-sectional view of an electronic device 500. The electronic device 500 can be substantially similar to, and can include some or all of the features of the electronic devices described herein. The electronic device 500 can include one or more speaker assemblies 518 disposed in a housing 504. Each speaker assembly 518 can include a speaker module 520 and a speaker enclosure 524. The speaker assembly 518 can be substantially similar to, and can include some or all of the features of the speaker assemblies described herein. As discussed herein, the speaker module 520 can include a first woofer 534a and a second woofer 534b. The first woofer 534a can be in communication with the speaker volume 540 through a first tunnel, opening, or aperture 530a. Likewise, the second woofer 534b can be in communication with the speaker volume 540 through a second tunnel 530b. It will be appreciated that because the first woofer 534a and the second woofer 534b can be oriented in opposite directions, the first tunnel 534a and the second tunnel 534b can connect to opposing portions or sides of each woofer 534a, 534b. In addition to the generally L-shaped rib 542 which divides the speaker volume 540 to create a ported speaker, the speaker enclosure 524 can also include support ribs 543 that can brace or stiffen one or more walls of the speaker enclosure 524. In some examples, the speaker enclosure 524 can have a stiffness such that a first resonant mode of the enclosure is more than about 3000 Hz, more than about 3500 Hz, more than about 4000 Hz, more than about 4500 Hz, or more than about 5000 Hz or greater. These additional support ribs 543 can also serve to direct airflow within the ported speaker enclosure 524. For instance, the ribs 542, 543 can be positioned to direct acoustic waves toward a port 548 which leads to the ambient environment. In some examples, the enclosure 524 can include ribs 543 and may not include an L-shaped rib 542. In some examples, the enclosure 524 can include any number of ribs 543 disposed at any number of locations and in any number of orientations. In some examples where the enclosure 524 includes multiple ribs 543, the ribs can have the same general size or can have a variety or range of sizes. Further details of an electronic device including speaker assemblies is provided below with reference to FIG. 7C.

Figure 7C:
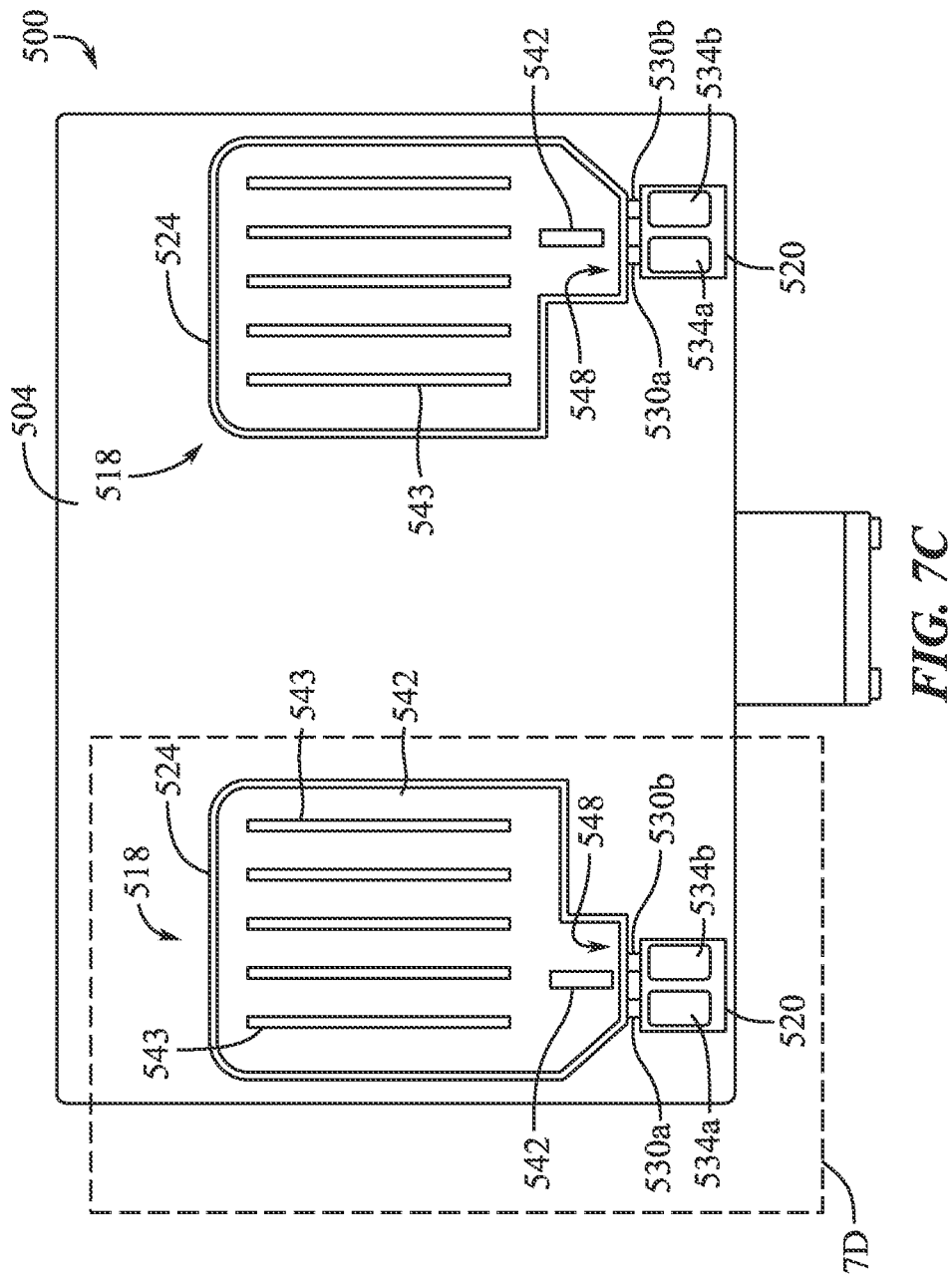
FIG. 7C shows a cross-sectional front view of an electronic device.

FIG. 7C illustrates a cross-sectional view of an electronic device 500. The electronic device 500 can be substantially similar to, and can include some or all of the features of the electronic devices described herein. The electronic device 500 can include one or more speaker assemblies 518 disposed in a housing 504. Each speaker assembly 518 can include a speaker module 520 and a speaker enclosure 524. The speaker assembly 518 can be substantially similar to, and can include some or all of the features of the speaker assemblies described herein. As discussed herein, the speaker module 520 can include a first woofer 534a and a second woofer 534b. The first woofer 534a can be in communication with the speaker volume 540 through a first tunnel, opening, or aperture 530a. Likewise, the second woofer 534b can be in communication with the speaker volume 540 through a second tunnel, opening, or aperture 530b. It will be appreciated that because the first woofer 534a and the second woofer 534b can be oriented in opposite directions, the first tunnel 534a and the second tunnel 534b can connect to opposing portions or sides of each woofer 534a, 534b. In some examples, the speaker enclosure 524 can include one or more ribs 543 that can divide the speaker volume 540, for example, to create or lengthen an airflow pathway. In some examples, the ribs 543 can have substantially a same size and shape, and can be oriented in any desired position. In some examples, the ribs 543 can be oriented parallel with one another. In some examples, the speaker enclosure 524 can include between 1 and 10 ribs 543, for example about 5, or between 1 and 100 ribs 543. In some examples, the ribs 543 can brace or stiffen one or more walls of the speaker enclosure 524. In some examples, the speaker enclosure 524 can also include a divider 542, for example, in the form of a rib or other component that can at least partially separate an output pathway 548 or a port of the speaker enclosure 524 from another portion of the airflow pathway, for example, to achieve similar acoustical effects as a ported speaker.

Figure 7D:
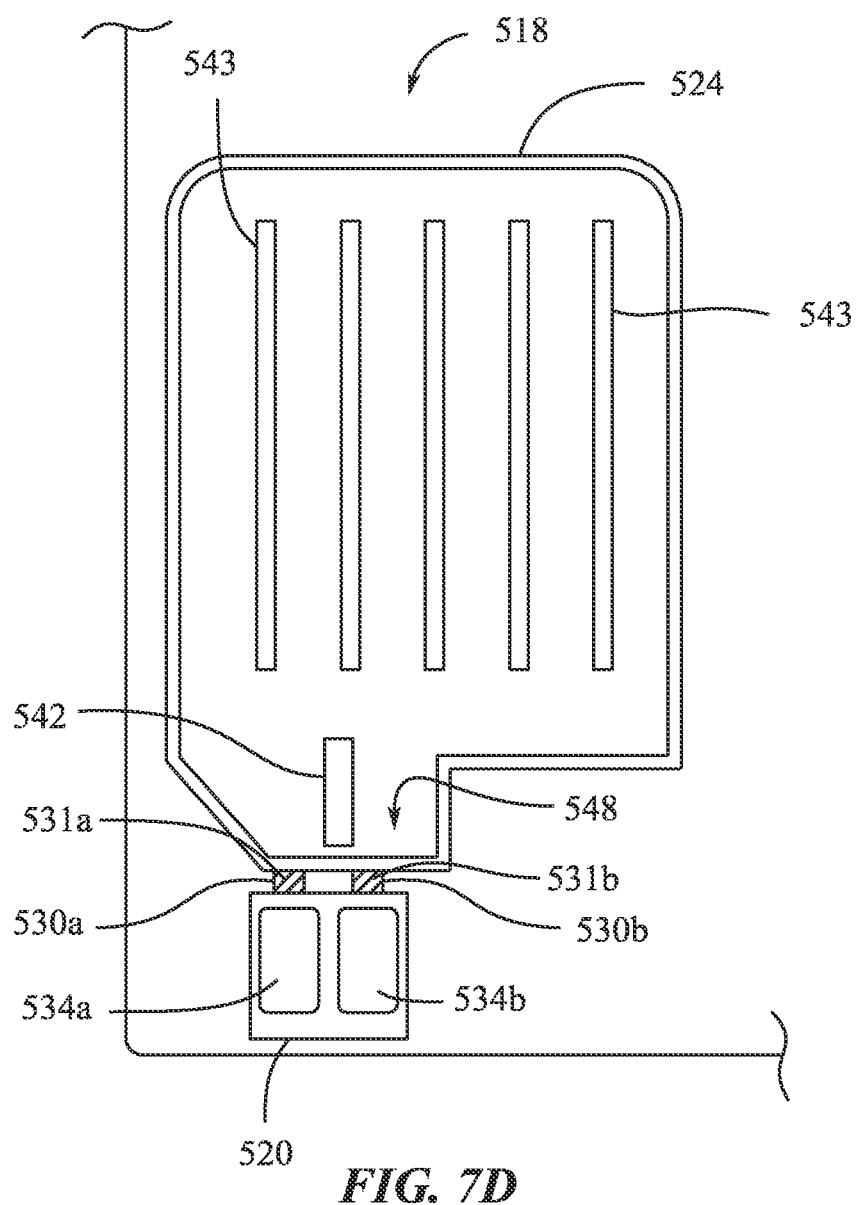
FIG. 7D shows a cross-sectional front view of a portion of an electronic device.

FIG. 7D shows a close-up view of a portion of the electronic device 500 shown in FIG. 7C. In this example, one or more air-permeable components 531a, 531b can be disposed in one or both of the tunnels 530a, 530b between the speaker module 520 and the speaker enclosure 524. In some examples, the air-permeable components 531a, 531b can include a material such as a foam and/or mesh, as described herein. In some examples, the air-permeable components 531a, 531b can occupy substantially an entire volume defined by the tunnels 530a, 530b. In some other examples, however, the air-permeable components 531a, 531b may only occupy a portion of one or both of the tunnels 530a, 530b. In use, the air-permeable components 531a, 531b can serve to reduce the velocity of air flowing through one or both of the tunnels 530a, 530b, thereby reducing undesirable flow noise and providing for a clearer acoustic signal to be heard by a user. Further details of speaker assemblies are provided with respect to FIGS. 8A-8C.

Figure 8A:
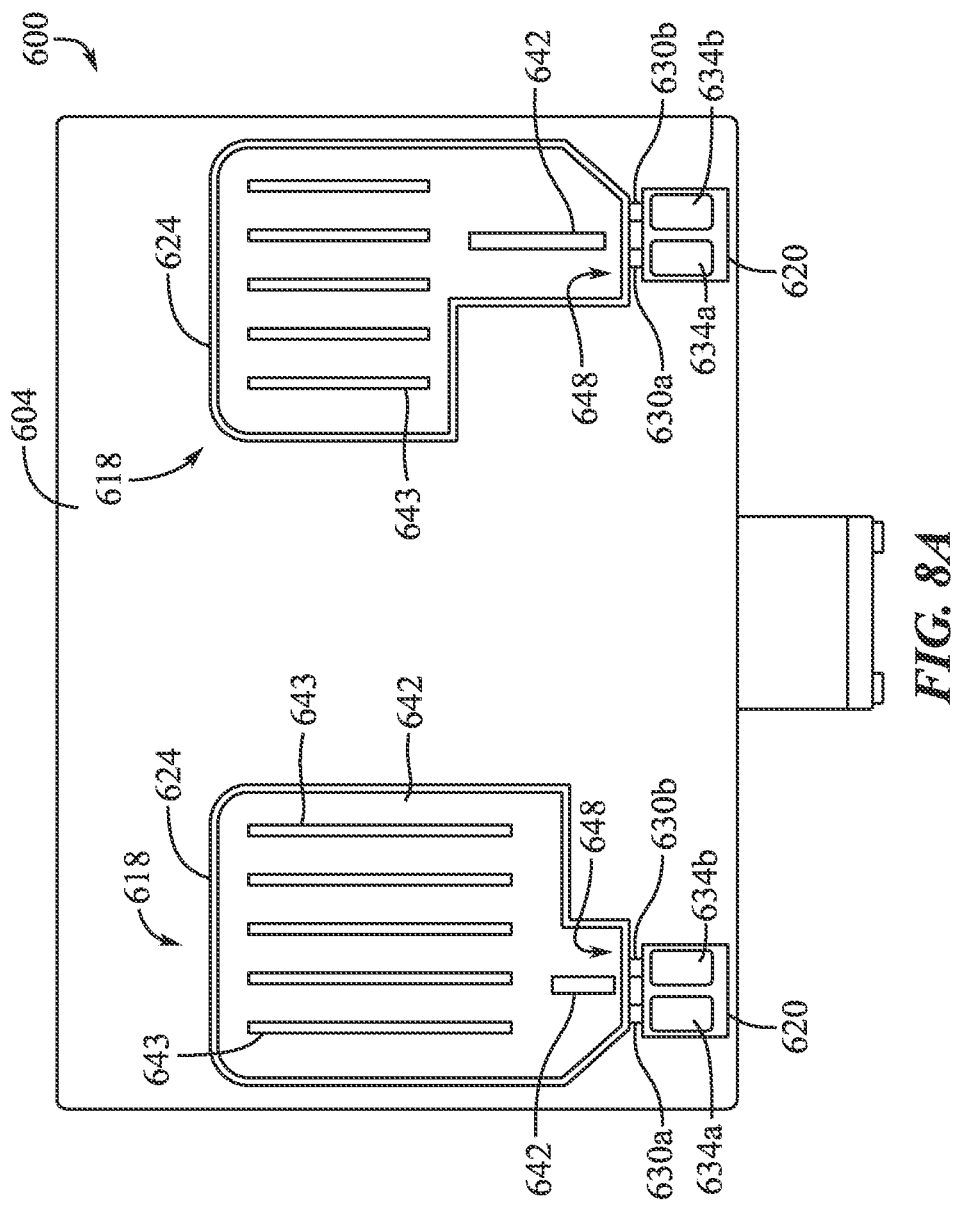
FIG. 8A shows a cross-sectional front view of an electronic device.

FIG. 8A illustrates a cross-sectional front view of an electronic device 600. The electronic device 600 can be substantially similar to, and can include some or all of the features of the electronic devices described herein. The electronic device 600 can include a housing 604 which contains one or more speaker assemblies 618 in an internal volume at least partially defined by the housing 604. Each speaker assembly 618 can include a speaker enclosure 624 connected to a speaker module 620 by one or more tunnels 630a, 630b. The speaker assembly 618 can be substantially similar to, and can include some or all of the features of the speaker assemblies described herein. The speaker modules 620 can each include a first woofer 634a and a second woofer 634b. In some examples, the speaker enclosure 624 can define a speaker volume 640. The speaker enclosure 624 can also include a divider 642 and one or more support ribs 643 positioned within the speaker volume 640, for example, to create or define an airflow pathway 648 similar to that of a ported speaker enclosure. In some examples, and as shown, the electronic device 600 can include two speaker enclosure 624 that can have different sized speaker volumes 640. For example, one or both speaker enclosures 624 can be sized and shaped to conform to the layout of other components within the electronic device 600. In some examples, the acoustic energy output by the speakers 620 can be adjusted, for example, by a processor associated with the speakers 620, to compensate for any difference in size between multiple speaker volumes 640 so that the acoustic output from each speaker assembly 618 is be substantially similar.

Figure 8B:
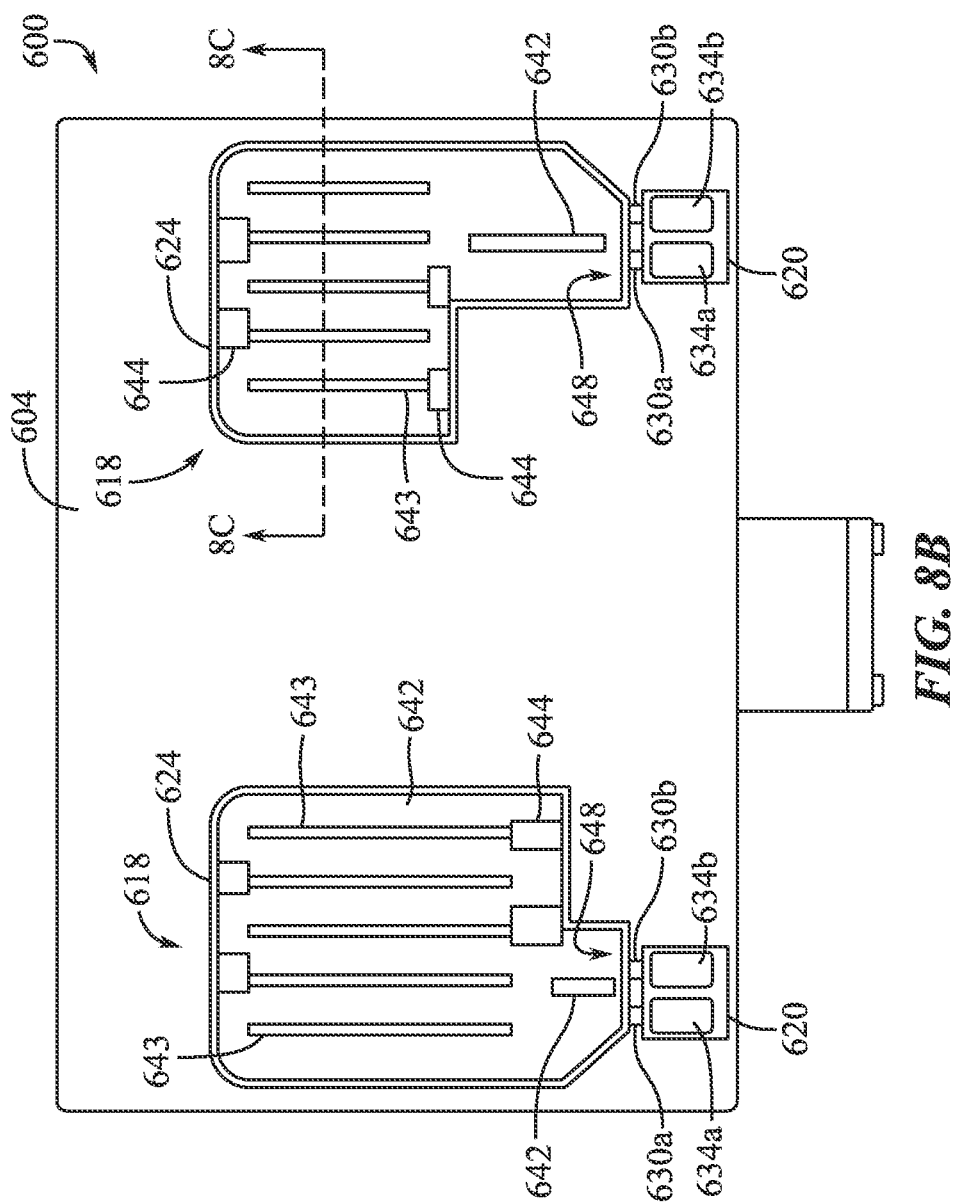
FIG. 8B shows a cross-sectional front view of an electronic device.

FIG. 8B shows a cross-sectional view of the electronic device 600 illustrated in FIG. 8A including waveguide components 644 positioned in the speaker volume 640 defined by the speaker enclosure 624 at desired locations. In some examples, the waveguide components 644 can include plastic, rubber, foam, metal, or any other material that can block or at least impede the flow of air in the speaker volume 640, such as a closed-cell or open-cell foam. In some examples, the component can be positioned adjacent to an end portion of a rib 643, for example, to block an airflow pathway at that location. By placing multiple components 644 at desired locations adjacent to the ribs 643, the airflow pathway in the speaker volume 640 can be effectively lengthened, for example, to control or tune one or more qualities of the sound output by the speaker assembly 618, as desired. In some examples, by lengthening the effective airflow pathway in the speaker volume 640 the resonant frequency of the speaker enclosure 624 can be increased. In some examples, the density and/or porosity of the waveguide components can be selected to control airflow in the speaker volume 640 and to control the resonant frequency of the speaker enclosure 624.

FIG. 8C shows a cross-sectional view of the speaker enclosure 624 taken along the line shown in FIG. 8B. As described herein, in some examples, the speaker enclosure 624 can include a five-sided box architecture. In some examples, the speaker enclosure 624 can have a metal construction, such as a piece of sheet metal, including a sheet of stainless steel. In some examples, the sheet metal can have a thickness of between about 0.05 mm and about 2 mm, between about 0.1 mm and about 1 mm, or between about 0.15 mm and about 0.5 mm, for example, about 0.2 mm. In some examples, various features of the speaker enclosure 624 can be defined by or formed in the portion of sheet metal. As shown, in some examples, the ribs 643 can be defined by the speaker enclosure 624. In some examples, features such as the ribs 643 can be formed in the sheet by a stamping process or any other desired manufacturing process. Further details of electronic devices and speaker assemblies are described below with reference to FIG. 9.

Figure 9:
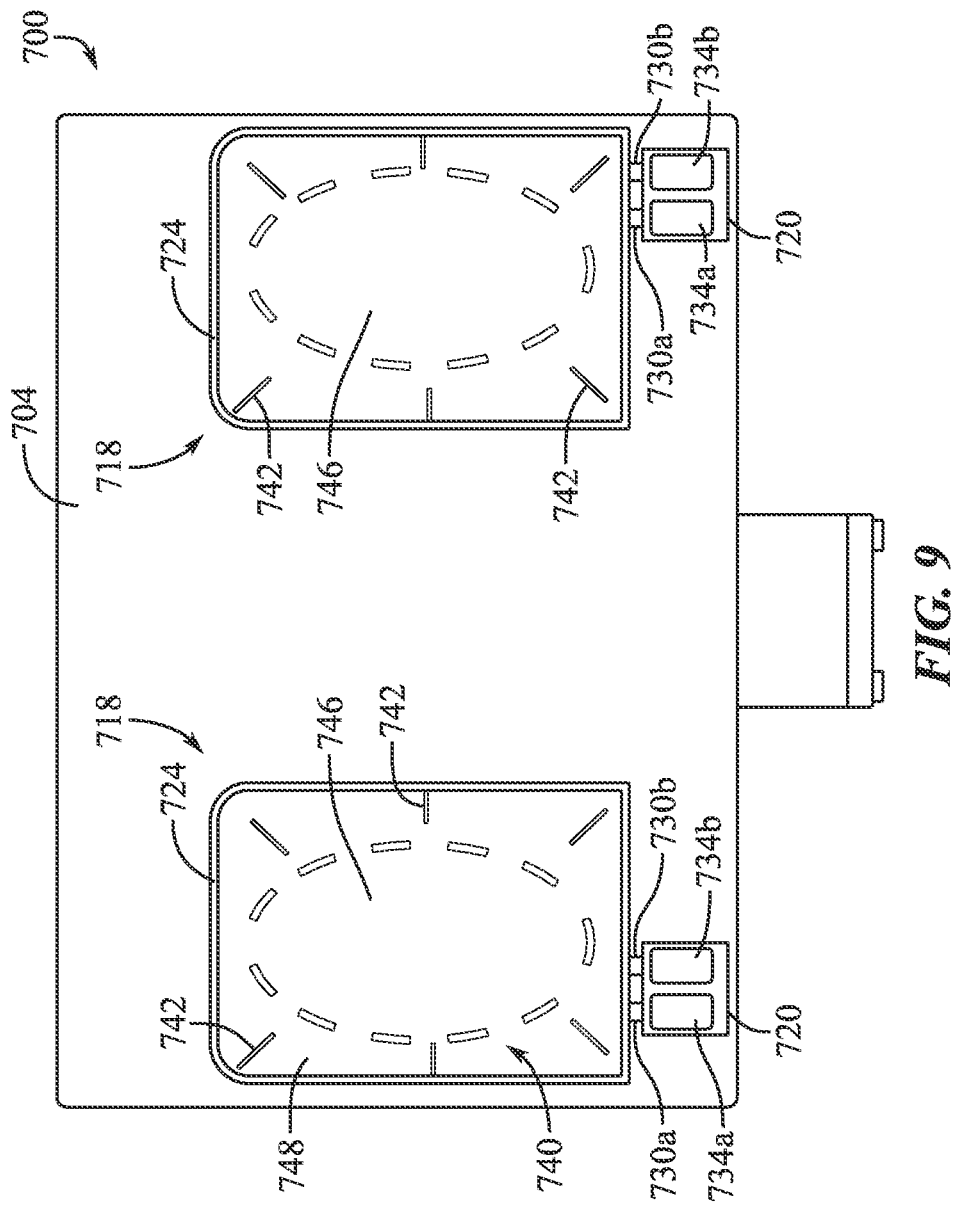
FIG. 9 shows a cross-sectional front view of an electronic device.

FIG. 9 illustrates a cross-sectional front view of an electronic device 700. The electronic device 700 can be substantially similar to, and can include some or all of the features of the electronic devices described herein. The electronic device 700 can include a housing 704 which contains one or more speaker assemblies 718 in an internal volume at least partially defined by the housing 704. Each speaker assembly 718 can include a speaker enclosure 724 connected to a speaker module 720 by one or more tunnels 730a, 730b. The speaker assembly 718 can be substantially similar to, and can include some or all of the features of the speaker assemblies described herein. The speaker modules 720 can each include a first woofer 734a and a second woofer 734b. In some examples, the speaker enclosure 724 can define a speaker volume 740. The speaker enclosure 724 can also include support ribs 742 positioned within the speaker volume 740. In some examples, a flexible portion 746 of the speaker enclosure 724 can have mechanical properties such that it can function as a suspension spring or passive radiator.

The positioning of the support ribs 742 can define the flexible portion 746 and a rigid portion 748 of one or more of the walls of the speaker enclosure 724. In some examples, the flexible portion 746 can oscillate or vibrate in a desired manner in response to acoustic waves emitted from the speaker module 720. The rigid portion 748 can be held secure and stiffened by the ribs 742 and/or the material of the speaker enclosure 724 itself. In other words, the flexible portion 746 can function as a passive radiator that uses the sound otherwise trapped in the speaker enclosure 724 to excite a resonance on the flexible portion 746. In some examples, the material and/or thickness of the wall or walls of the enclosure 724 provides the stiffness and strength in the rigid portion 748, and the flexibility and tolerance in the flexible portion 746. In other words, the support ribs 742 may not be necessary to create a passive radiator within the speaker enclosure 724. In some examples, the support ribs 742 define an oval shaped flexible portion 746 which acts as the passive radiator. Other shapes and configurations of the flexible portion 746 are possible. In some examples, the entirety of the wall of the speaker enclosure 724 can vibrate as the passive radiator. That is, the entire wall surface can vibrate or oscillate in response to the acoustic waves emitted from the speaker module 720. In some examples, the flexible portion 746 can include additional material or can be heavier than the material of the rigid portion 748. For example, brass or tungsten plates can be added to the flexible portion 746 in order to add mass and attune the resonant frequency of the flexible portion 746. Further details of speaker assemblies are provided below with reference to FIGS. 10A and 10B.

Figure 10A:
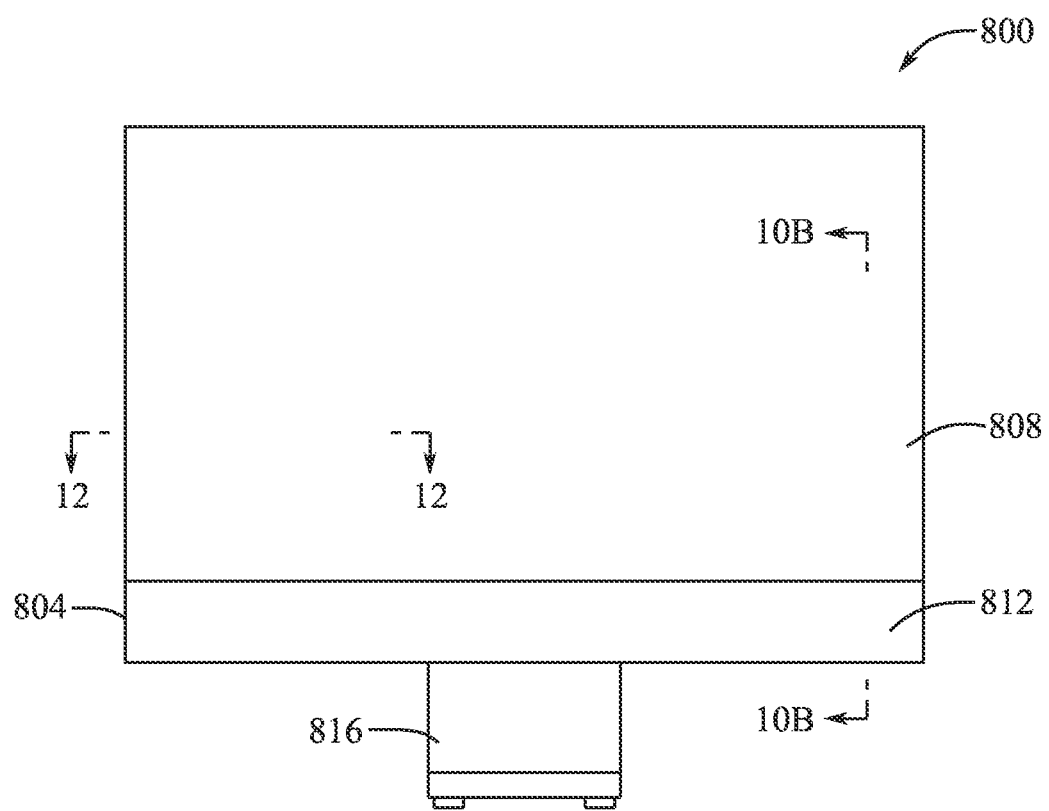
FIG. 10A shows a front view of an electronic device.
Figure 10B:
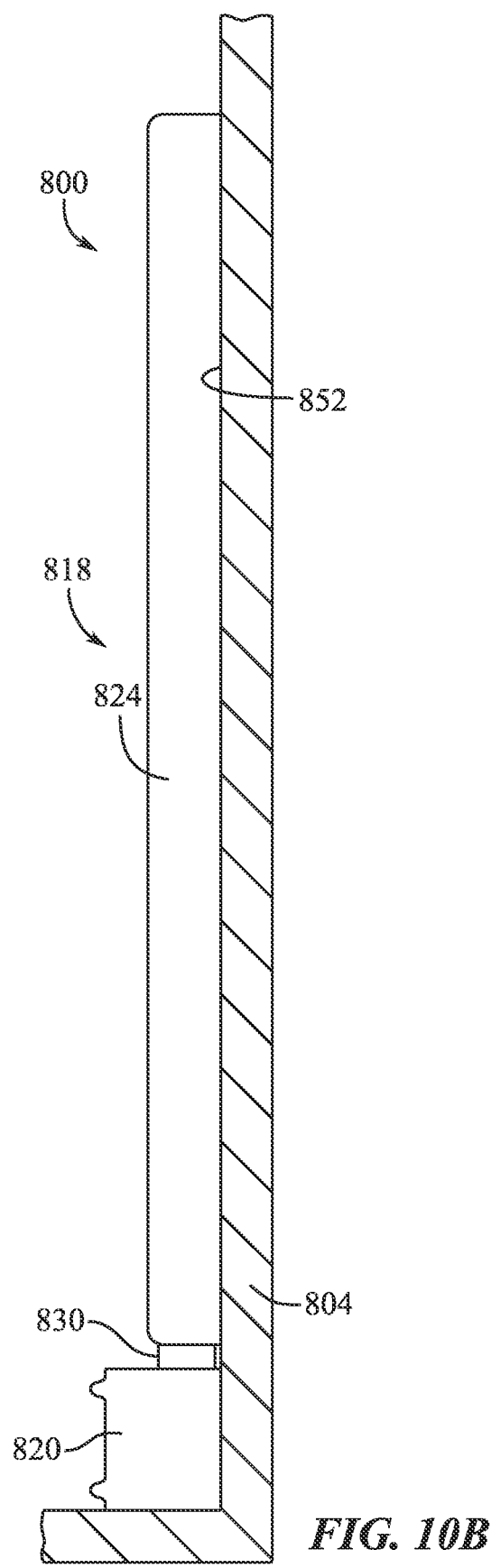
FIG. 10B shows a cross-sectional side view of the electronic device of FIG. 10A.

FIG. 10A illustrates a front view of an electronic device 800 and FIG. 10B illustrates a cross-sectional side view of the electronic device 800 taken from cross-section 10B-10B as shown in FIG. 10A. The electronic device 800 can be substantially similar to, and can include some or all of the features of the electronic devices described herein. The electronic device can include a speaker assembly 818 positioned on the housing 804. The speaker assembly 818 can include a speaker enclosure 824 connected to a speaker module 820 through a port 830. In some examples, the speaker enclosure 824 can be affixed to an interior surface 852 of the housing 804. As discussed herein, the speaker enclosure 824 can include a variable amount of sides or regions. In other words, a speaker volume 840 can be defined not only by the speaker enclosure 824, but also by one or more walls or regions of the housing 804, for instance, the interior surface 852. In some examples, the speaker enclosure 824 can be a five-sided box having an open side that defines an aperture. As used herein, the term "five-sided box" refers to any generally three-dimensional enclosure, such as a cuboid shaped enclosure, that partially defines a volume but that includes single aperture so as to not fully enclose the volume. That is, where the term "six-sided box" can be used to refer to an enclosure that completely defines and encloses an internal volume, the term "five-sided box" is used to refer to an enclosure that defines a volume and a single aperture, with an additional component or components required to occlude the aperture and completely enclose the volume. Along the same lines, the term "four-sided box" can refer to an enclosure that partially defines a volume but that also defines two aperture or holes disposed opposite one another. Thus, a four-sided box can also be considered as a tube, and requires components to occlude both apertures and fully enclose the volume partially defined by the four-sided box. Although referred to as a box, a six-sided box enclosure, a five-sided box enclosure, and a four-sided box enclosure can have any shape. The speaker enclosure 824 can then be positioned on the back interior surface 852 of the housing 804 such that the interior surface covers or occludes the open side of the speaker enclosure 824 to form a back volume. In some examples, the speaker enclosure 824 can be a four-sided box, with the interior surface 852 occluding one aperture or open side, and an additional component or components occluding the opposite aperture or open side. Further details of speaker assemblies are provided below with reference to FIG. 11.

Figure 11:
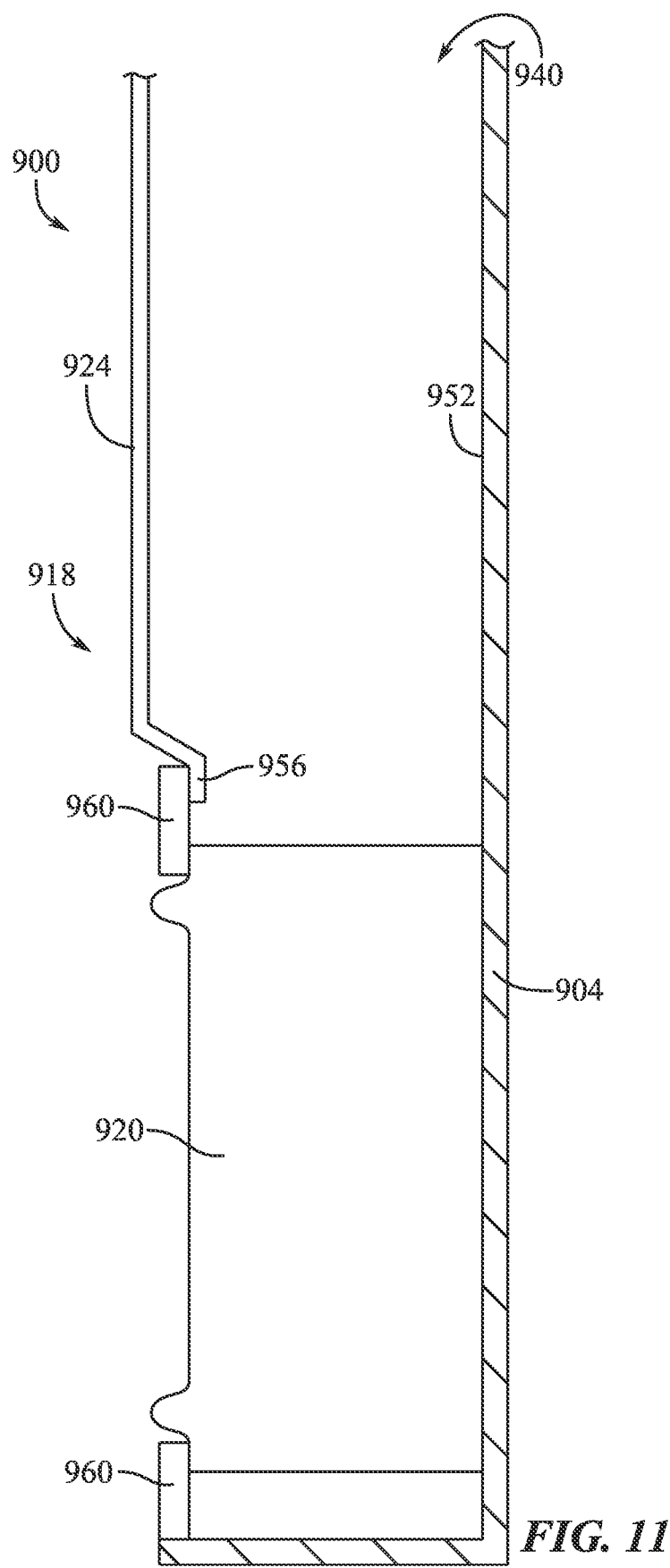
FIG. 11 shows a cross-sectional side view of an electronic device.

FIG. 11 illustrates a cross-sectional side view of an electronic device 900 including a speaker assembly 918. The cross-sectional view can be substantially similar to the cross-section 9B-9B as shown in FIG. 10A. The electronic device 900 can be substantially similar to, and can include some or all of the features of the electronic devices described herein. In some examples, a speaker volume 940 is defined by a speaker enclosure 924 and an interior surface 952 of the housing 904. A wall of the speaker enclosure 924 can include a flange 956 surrounding the perimeter of the speaker enclosure 924. The flange 956 can be secured to the speaker module 920 by one or more securing elements 960, such as a pressure sensitive adhesive (PSA). The speaker module 920 can further be coupled to the housing 904 by the securing elements 960. The flange 956 of the speaker enclosure 924 can allow for additional volume within the speaker volume 940. In some examples, the thickness of the speaker enclosure 924 can vary depending on the placement of internal components within the housing 904. For instance, various electronic or structural components within the housing 904 can require that the speaker enclosure 924 be reduced in size and certain places. Accordingly, the speaker enclosure 924 can have a varying thickness to maximize the speaker volume 940 while still providing room for additional components of the device 900. An additional advantage of maximizing the thickness of the speaker volume is to reduce the effects of friction between the moving air and the internal walls of the speaker enclosure, thereby providing enhanced acoustical performance. Further details of electronic devices including speaker assemblies are provided below with reference to FIG. 12.

Figure 12:
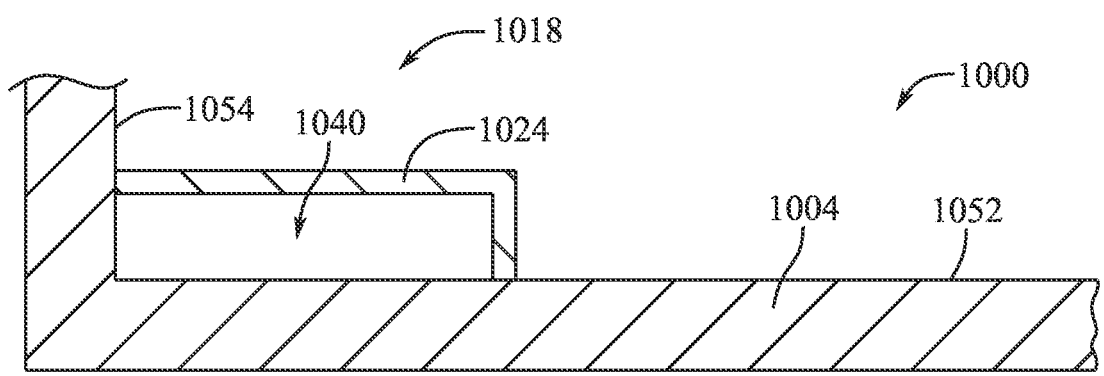
FIG. 12 shows a cross-sectional top view of an electronic device.

FIG. 12 illustrates a cross-sectional top view of an electronic device 1000 including a speaker assembly 1018 having a speaker enclosure 1024 and a speaker module (not shown). The cross-sectional view is taken from the cross-section 12-12 as shown in FIG. 10A. The electronic device 1000 can be substantially similar to, and can include some or all of the features of the electronic devices described herein. In some examples, a speaker volume 1040 can be defined by two walls or regions of the housing 1004 (e.g., a back interior wall 1052 and a side wall 1054) and one or more walls of the speaker enclosure 1024. It will be understood that by removing one or more walls of the speaker enclosure 1024 and using instead the walls of the housing 1004 to define the speaker volume 1040, the speaker volume 1040 can be increased by the thickness of the walls that were removed of the speaker enclosure 1024. The speaker enclosure 1024 can then be fixed, attached, adhered, or otherwise secured to the walls of the housing 1004. For instance, the speaker assembly 1018 can be secured with screws, glue, brackets or any other fastening device or combinations thereof. In some examples, H-seals or gaskets can be used to seal the speaker volume from the ambient environment. The H-seals can be used in combination with foams for pressure sensitive adhesives. In some examples, the speaker enclosure 1024 is secured in the housing by being pressed between the internal surface 1052 and other electrical components within the housing 1004 such as the display (e.g., compression fit). Although the walls 1052, 1054 of the housing 1004 that define the speaker volume 1040 are shown as being substantially perpendicular, the walls 1052, 1054 can have any geometric arrangement and orientation. Further details of electronic devices including speaker assemblies are provided below with reference to FIG. 13.

Figure 13:
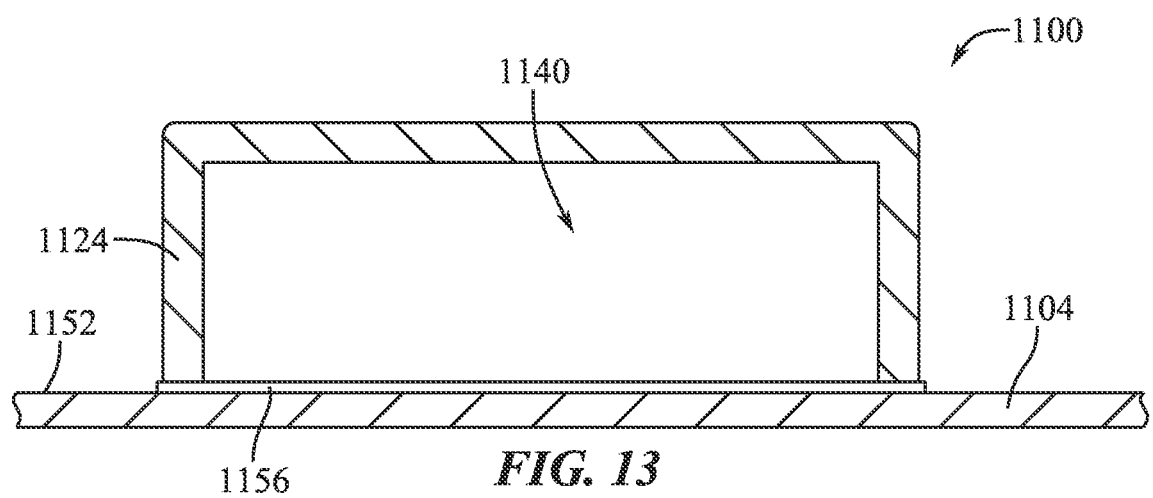
FIG. 13 shows a cross-sectional top view of an electronic device.

FIG. 13 illustrates a cross-sectional top view of an electronic device 1100. The cross-sectional view can be substantially similar to the cross-section 12-12 as shown in FIG. 10A. The electronic device 1100 can be substantially similar to, and can include some or all of the features of the electronic devices described herein. In some examples, the device 1100 can include a speaker assembly that includes a speaker module (not shown) and a speaker enclosure 1124. In some examples, the speaker enclosure 1124 can be a five-sided box having an open side or large aperture. In some examples, the speaker enclosure 1124 is ellipsoidal in shape, having no definitive edges, corners, or sides and including an aperture proximate the housing 1104. A sealing film, layer, or material 1156, such as a thin sheet of a textile or similar woven structure, a rubber sheet (or a sheet of any other polymeric material), or combinations thereof can be configured to cover or occlude the open end of the five-sided box 1124. The speaker enclosure 1124 can be secured to the interior surface 1152 of the housing 1104 such that the sealing film a 1156 is positioned between the speaker enclosure 1124 and the housing 1104. By securing the sealing film 1156 to the speaker enclosure 1124, the manufacturing process of the electronic device 1100 can be improved by ensuring a proper sealed volume between the speaker enclosure 1124 and the sealing film 1156 prior to securing the speaker enclosure 1124 to the housing 1104. The sealing film 1156 can be substantially thinner than a wall of the speaker enclosure 1124, thereby increasing the available speaker volume 1140 relative to a conventional six-sided box configuration. Further details of electronic devices including speaker assemblies are provided below with reference to FIGS. 14A and 14B.

Figure 14A:
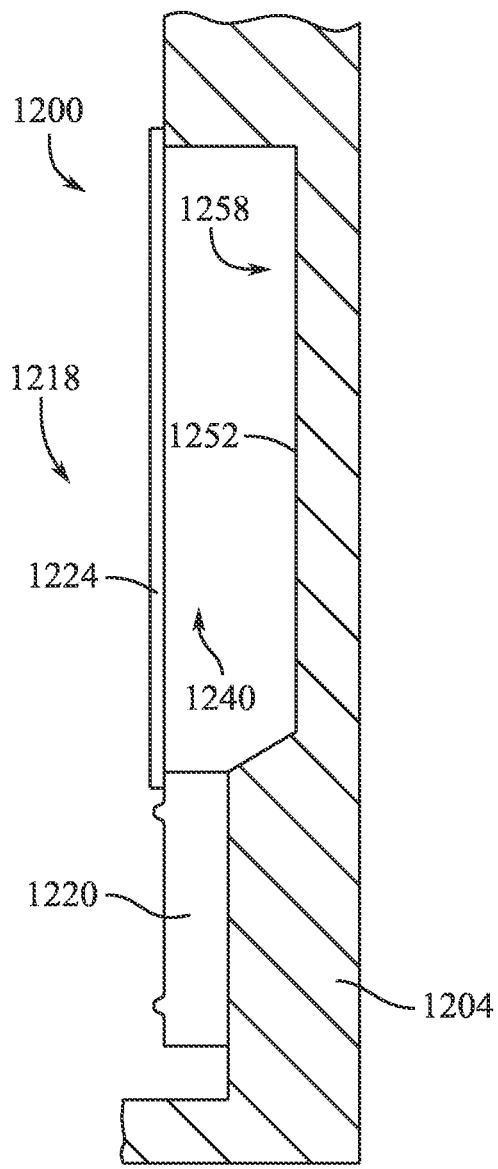
FIG. 14A shows a cross-sectional side view of an electronic device.

FIG. 14A illustrates a cross-sectional side view of an electronic device 1200. The cross-sectional view can be substantially similar to the cross-section 10B-10B shown in FIG. 10A. The electronic device 1200 can be substantially similar to, and can include some or all of the features of the electronic devices described herein. The electronic device 1200 can include a speaker assembly 1218 including a speaker enclosure 1224 and a speaker module 1220. In some examples, a housing 1204 of the electronic device 1200 can define a cavity, an indented, or a recessed region 1258 on the interior back wall 1252 of the housing 1204. The recessed region 1258 can maximize a speaker volume 1240 while still maintaining a reduced size of the speaker enclosure 1224. In some examples, the speaker volume 1240 can be defined by a single thin wall 1224 and by five walls of the recessed portion 1258, including the back wall 1252 and four side walls of the housing 1204. For instance, the speaker enclosure 1224 can function as a lid that covers an open end or aperture of the recessed portion 1258. In some examples, the speaker enclosure 1224 can be sealed directly to the speaker module 1220 and an internal surface of the housing 1204. In some examples, the recessed portion 1258 can extend until reaching a top wall of the housing 1204. In some examples, the recessed portion 1258 extends only partially up the back wall of the housing 1204 and can terminate before reaching the top wall of the housing 1204. Further details of speaker assemblies are provided below with reference to FIG. 14B.

Figure 14B:
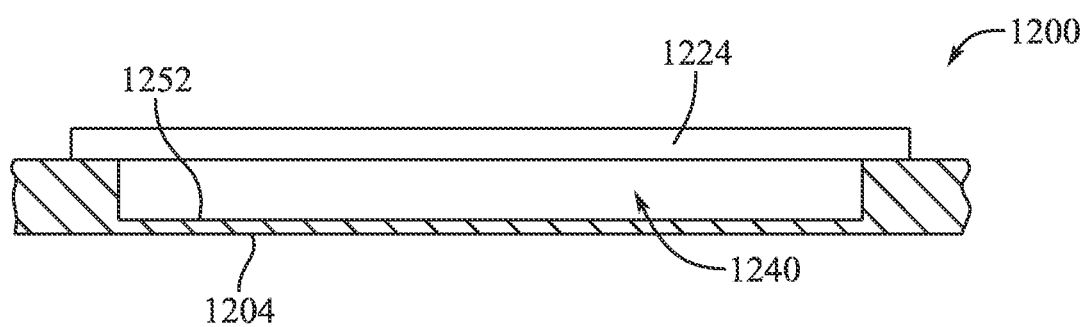
FIG. 14B shows a cross-sectional top view of an electronic device.

FIG. 14B shows a cross-sectional top view of an electronic device 1300. The cross-sectional view can be substantially similar to the cross-section 12-12 as shown in FIG. 10A. The electronic device 1300 can be substantially similar to, and can include some or all of the features of the electronic devices described herein. Similar to the electronic device 1100 of FIG. 14A, the electronic device 1300 can include a speaker enclosure 1324 that is positioned over a recessed portioned 1258 defined by the housing 1304 to define a speaker volume 1340. In some examples, the back wall 1352 of the housing 1304 can function as a passive radiator, similar to the flexible portion 746 discussed in regards to FIG. 9. In other words, the back wall 1352 of the housing 1304 can be thinned both to increase the speaker volume 1340 and to generate flexibility in the back wall 1352 to function as a passive radiator. Further details of speaker assemblies are provided below with reference to FIGS. 15A and 15B.

Figure 15A:
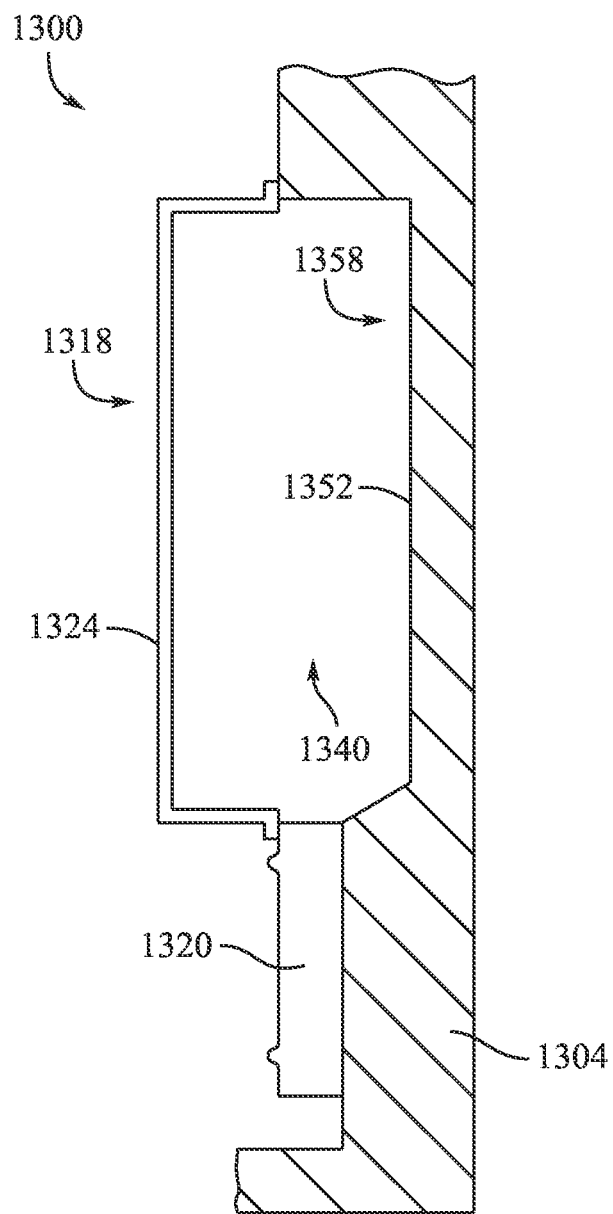
FIG. 15A shows a cross-sectional side view of an electronic device.

FIG. 15A illustrates a cross-sectional side view of an example electronic device 1300. The cross-sectional view can be substantially similar to the cross-section 10B-10B shown in FIG. 10A. The electronic device 1300 can be substantially similar to, and can include some or all of the features of, the electronic devices described herein. The electronic device 1300 can include a speaker assembly 1318 including a speaker enclosure 1324 and a speaker module 1320. In some examples, a housing 1304 of the electronic device 1300 can define a cavity, an indented region, or a recessed region 1358 on the interior back wall 1352 of the housing 1304. The recessed region 1358 can maximize a speaker volume 1340 while still maintaining a reduced size of the speaker enclosure 1324. In some examples, the speaker volume 1340 can be defined by sidewalls and a top wall of the enclosure 1324 and by five walls of the recessed portion 1358, including the back wall 1352 and four side walls of the housing 1304. For example, the speaker enclosure 1324 can function as a five-sided box that overlies an open end or aperture of the recessed portion 1358 to thereby provide additional volume to the enclosure 1324. In some examples, the speaker enclosure 1324 can be sealed directly to the speaker module 1320 and an internal surface of the housing 1304. In some examples, the recessed portion 1358 can extend until reaching a top wall of the housing 1304. In some examples, the recessed portion 1358 extends only partially up the back wall of the housing 1304 and can terminate before reaching the top wall of the housing 1304. Further details of speaker assemblies are provided below with reference to FIG. 15B.

Figure 15B:
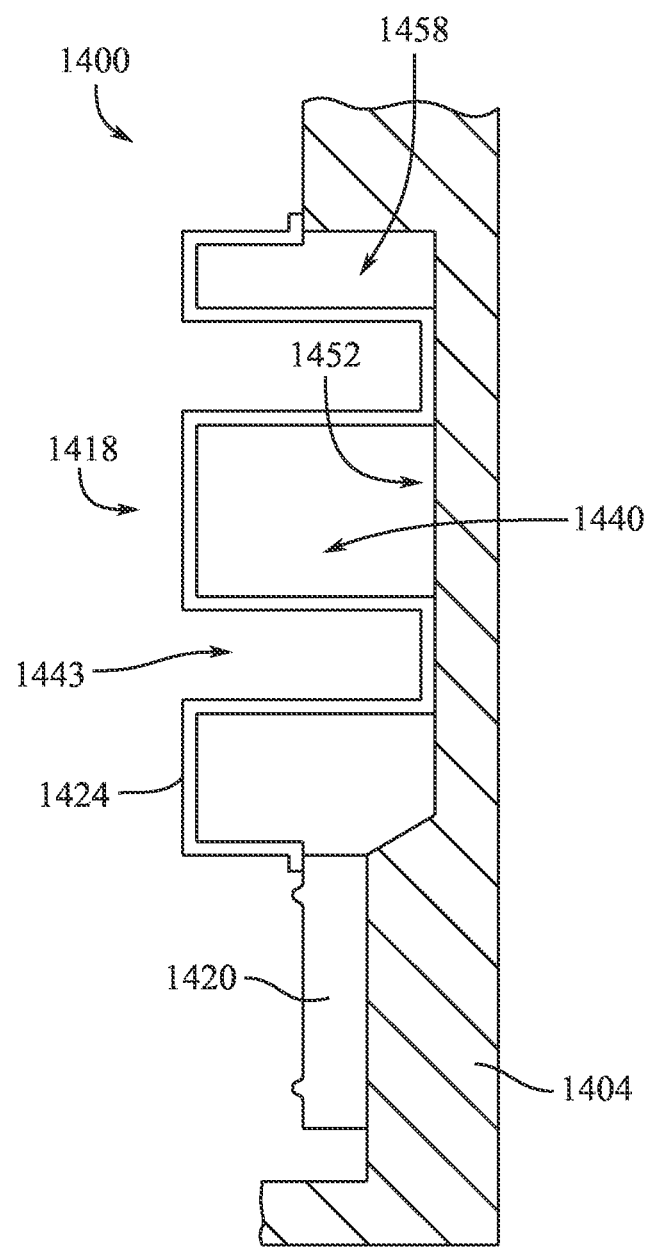
FIG. 15B shows a cross-sectional side view of an electronic device.

FIG. 15B illustrates a cross-sectional side view of an example electronic device 1400. The cross-sectional view can be substantially similar to the cross-section 10B-10B shown in FIG. 10A. The electronic device 1400 can be substantially similar to, and can include some or all of the features of, the electronic devices described herein. The electronic device 1400 can include a speaker assembly 1418 including a speaker enclosure 1424 and a speaker module 1420. In some examples, a housing 1404 of the electronic device 1400 can define a cavity, an indented region, or a recessed region 1458 on the interior back wall 1452 of the housing 1404. The recessed region 1458 can maximize a speaker volume 1440 while still maintaining a reduced size of the speaker enclosure 1424. In some examples, the speaker volume 1440 can be defined by sidewalls and a top wall of the enclosure 1424 and by five walls of the recessed portion 1458, including the back wall 1452 and four side walls of the housing 1404. Further, in some examples, the speaker enclosure 1424 can define one or more ribs 1443 that can direct airflow within the enclosure 1424, as described herein. In some examples, the ribs 1443 can extend into the recessed region 1458. In some examples, one or more ribs 1443 can contact or seal against the back wall 1452 to prevent or reduce airflow at those locations. In some examples, the speaker enclosure 1424 can be sealed directly to the speaker module 1420 and an internal surface of the housing 1404.

While the present disclosure generally describes speaker assemblies positioned in electronic devices, the components, features, and methods described herein can be used in any combination or order and with any desired component, portion, or electronic device. Further, the components and features described herein are not limited to the specific examples shown and can assume any geometric shape, pattern, size, or combination of shapes, patterns, and sizes, and can be included in any number an in any position or combination of positions. Additionally, the components can be made from any desired material or combination of materials and can be manufactured using any known or suitable manufacturing techniques.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. An electronic device, comprising:
   a housing defining an aperture;
   a display positioned in the aperture, the display and the housing defining an internal volume;
   a speaker enclosure positioned in the internal volume, the speaker enclosure and a wall of the housing opposite the display defining a speaker volume;
   a speaker module positioned in the internal volume and in fluid communication with the speaker volume; and
   a support rib positioned in the speaker volume, the support rib configured to structurally support a wall of the speaker enclosure.

2. The electronic device of claim 1, wherein the support rib is coupled to at least one of the housing or the wall of the speaker enclosure.

3. The electronic device of claim 1, wherein the support rib is positioned to tune a sound output of the speaker module.

4. The electronic device of claim 1, further comprising a waveguide component configured to impede airflow in the speaker volume.

5. The electronic device of claim 1, further comprising:
   a second speaker enclosure positioned in the internal volume and at least partially defining a second speaker volume; and
   a second speaker module positioned in the internal volume in fluid communication with the second speaker volume.

6. The electronic device of claim 1, wherein:
   the display at least partially defines a first exterior surface of the electronic device;
   the housing at least partially defines a second exterior surface of the electronic device positioned opposite the first exterior surface; and
   a distance from the first exterior surface to the second exterior surface is between 9 mm and 13 mm.

7. The electronic device of claim 1, wherein the support rib at least partially defines a flexible portion of the speaker enclosure and a rigid portion of the speaker enclosure.

8. The electronic device of claim 1, wherein the support rib is a first rib of a plurality of support ribs positioned in the speaker volume.

9. The electronic device of claim 1, wherein:
the speaker module comprises a first side and a second side opposite the first side;
the first side is in fluid communication with an ambient environment; and
the second side is in fluid communication with the speaker volume.

10. The electronic device of claim 1, wherein:
the support rib at least partially divides the speaker volume into a first volume, and a second volume in fluid communication with the first volume; and
the first volume is in fluid communication with the speaker module, and the second volume is in fluid communication with a port at least partially defined by the speaker enclosure.

11. The electronic device of claim 1, wherein the support rib extends into a recess formed in the housing.

12. An electronic device, comprising:
a housing at least partially defining an internal volume, the housing comprising a wall that defines a recessed region and at least partially defines an exterior surface of the electronic device;
a speaker enclosure disposed in the internal volume, the speaker enclosure and the wall at least partially defining a speaker volume, the speaker enclosure defining a stiffening rib extending into the recessed region; and
a speaker module disposed in the internal volume and in fluid communication with the speaker volume.

13. The electronic device of claim 12, wherein the speaker volume is isolated from an ambient environment.

14. The electronic device of claim 12, wherein the wall defines five walls of the speaker volume.

15. The electronic device of claim 14, wherein the speaker enclosure comprises a single thin wall, the wall and the single thin wall defining the speaker volume.

16. The electronic device of claim 12, wherein the speaker module directs a negative acoustic wave into the speaker volume, the negative acoustic wave generating a desired acoustic output.

17. A speaker system, comprising:
an enclosure defining an internal volume;
a speaker module in fluid communication with the internal volume; and
a rib positioned in the internal volume and configured to stiffen the enclosure, the rib configured to tune a sound output of the speaker module;
wherein:
a first wall of the enclosure comprises a first port and a second port;
the first port is in fluid communication with the internal volume; and
the rib extends from the first wall between the first and second ports.

18. The speaker system of claim 17, wherein the rib is configured to direct airflow in the internal volume.

19. The speaker system of claim 17, wherein the rib is stamped into the enclosure.

20. The speaker system of claim 17, wherein a second wall of the enclosure comprises:
a flexible portion configured to oscillate; and
a rigid portion at least partially surrounding the flexible portion, the rib being in contact with the rigid portion.

* * * * *

UNITED STATES PATENT AND TRADEMARK OFFICE
CERTIFICATE OF CORRECTION

| | | |
|---|---|---|
| PATENT NO. | : 11,950,036 B2 | Page 1 of 1 |
| APPLICATION NO. | : 18/165457 | |
| DATED | : April 2, 2024 | |
| INVENTOR(S) | : Wang et al. | |

It is certified that error appears in the above-identified patent and that said Letters Patent is hereby corrected as shown below:

On the Title Page

Item (72), add:
Navpreet S. Kaloty, San Jose, CA (US)

Signed and Sealed this
Twentieth Day of May, 2025

Coke Morgan Stewart
*Acting Director of the United States Patent and Trademark Office*